United States Patent [19]

Takehara et al.

[11] Patent Number: 5,015,006

[45] Date of Patent: May 14, 1991

[54] SUSPENSION APPARATUS OF A VEHICLE

[75] Inventors: Shin Takehara; Toshiki Morita, both of Hiroshima, Japan

[73] Assignee: Mazda Motor Corporation, Hiroshima, Japan

[21] Appl. No.: 543,407

[22] Filed: Jun. 26, 1990

[30] Foreign Application Priority Data

Jun. 27, 1989 [JP] Japan .................................. 1-164614
Jun. 27, 1989 [JP] Japan .................................. 1-164615
Jun. 27, 1989 [JP] Japan .................................. 1-164616

[51] Int. Cl.⁵ .............................................. B60G 17/08
[52] U.S. Cl. ..................................... 280/707; 280/714; 346/424.01
[58] Field of Search ................. 280/707, 714; 346/424, 346/424.1, 426

[56] References Cited

U.S. PATENT DOCUMENTS 4,821,188  4/1989  Ikemoto et al. ..................... 280/707
4,821,191  4/1989  Ikemoto et al. ..................... 280/707
4,867,476  9/1989  Yamanaka et al. .................. 280/707
4,911,470  3/1990  Fukunaga .......................... 280/707
4,953,890  9/1990  Kamimura ......................... 280/707

Primary Examiner—Kenneth R. Rice
Attorney, Agent, or Firm—Fish & Richardson

[57] ABSTRACT

The suspension system has a cylinder unit disposed at each wheel for displacing a vehicle height of the vehicle body by a supply or a discharge of operating liquid and a vehicle height sensor disposed at each wheel for sensing the vehicle height of the body. An actual status amount of the posture of the body, such as a pitch amount or a roll amount, is determined on the basis of output from the vehicle height sensor, thereby controlling the supply or discharge of the operating liquid to or from the cylinder unit in order to allow the actual posture amount to reach a given target value. When the running status is detected to such an extent that changes the status amount, the target value can be corrected in anticipation prior to a change in the posture status amount, thereby preventing the change in the posture status amount. The running state includes, for example, when the range position of the automatic transmission is shifted from the range P or N to the running range, when the brake for braking the brake is operated, and when the steering wheel is rapidly steered.

30 Claims, 17 Drawing Sheets

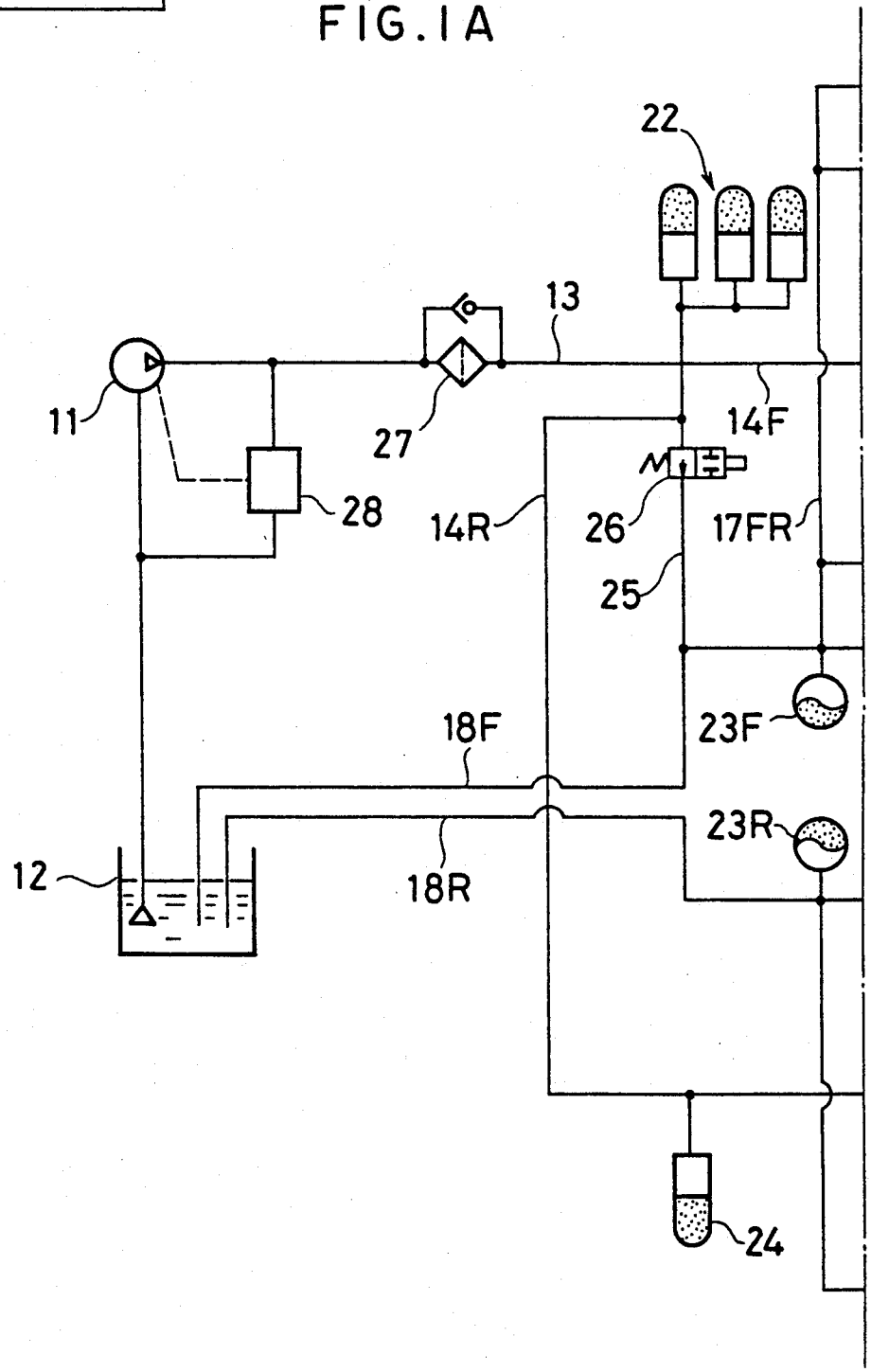

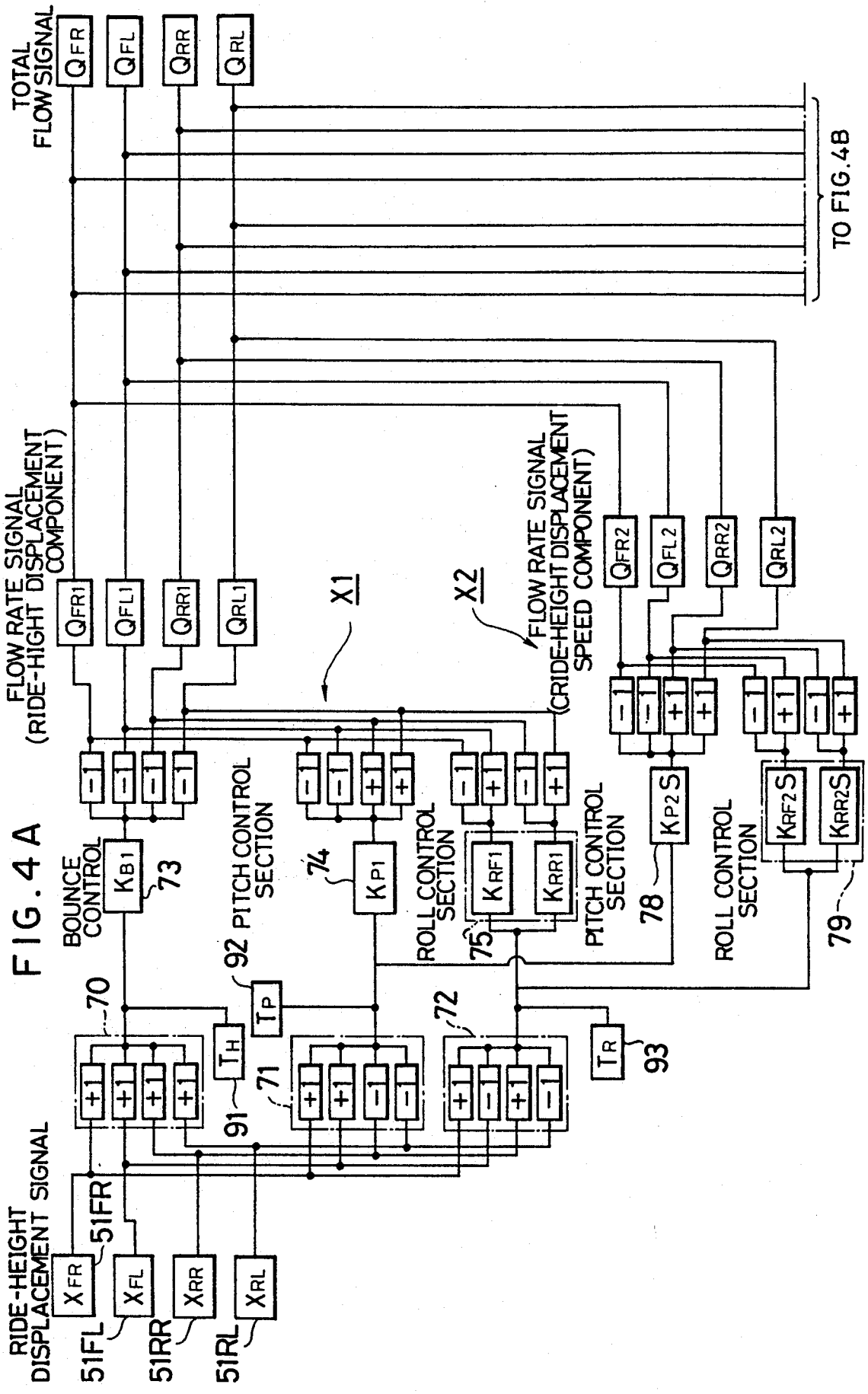

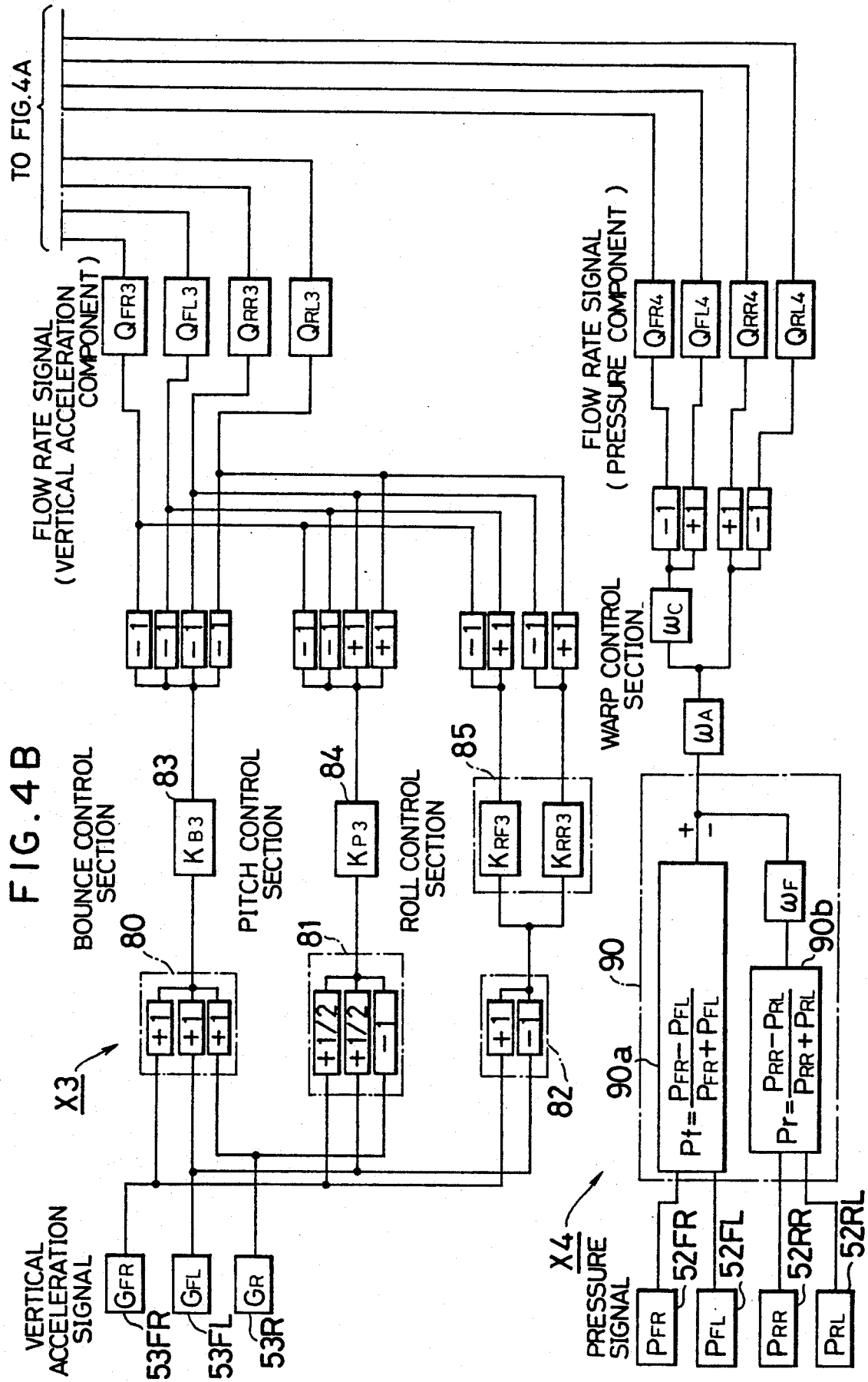

SUSPENSION APPARATUS OF A VEHICLE

BACKGROUND OF THE INVENTION

1. Field of the Invention

The present invention relates to a suspension apparatus of a vehicle.

2. Description of Related Art

A suspension apparatus of a vehicle, as is generally called a passive suspension, has a damper unit comprising a hydraulic damper and a spring (generally a coil spring), and a suspension characteristic is equally set on the basis of a predetermined characteristic of the damper unit. Although the damping force of the hydraulic damper can be variable, this cannot largely change the suspension characteristic.

Recently, a suspension apparatus, as called an active suspension, has been proposed, which allows a change in the suspension characteristic in an arbitrary fashion. This active suspension is basically designed so as to control the suspension characteristic by controlling a supply and a discharge of operating liquid to or from a cylinder unit interposed between a sprang weight and an unsprung weight.

In the active suspension, the suspension characteristic can be changed to a great extent by a variety of control such as ride height control, roll control, pitch control, etc. And for the active suspension, a ride height sensor for detecting a ride height of the vehicle body is used basically for posture control.

It is noted herein that the vehicle with an automatic transmission may cause pitching, as a so-called squatting phenomenon, upon shifting range positions from its rest position to driving position. For instance, for the vehicle of the rear wheel drive type, when the speed range positions are shifted from the parking range position P or neutral range position N to the driving range position D, torque of the engine is transmitted to cause the rear wheels to advance while the vehicle body is prone to staying at its rest position due to its large inertia, thereby causing the height of the rearward portion of the vehicle body to become lower while the height of the forward portion thereof to raise, i.e., the squatting phenomenon. The degree of this squatting phenomenon is represented as a pitch angle indicating an angle of inclination of the vehicle body. It is therefore considered that this active suspension unit be incorporated into the vehicle with the automatic transmission, with the attempt to prevent an occurrence of the pitching phenomenon likely to be caused resulting from shifting the range positions as described hereinabove by means of the pitch control by the active suspension unit. This pitch control however, is operated so as to control the pitching after it has actually occurred, so that there should be a delay in operation of this unit in response to the actual occurrence of the pitching phenomenon. Therefore, the pitching resulting from the shifting of the range positions cannot be controlled to a sufficient extent.

Further, when the brake is operated to suspend the vehicle body, there may occur a pitch, as a so-called nose-diving phenomenon, which is a phenomenon in which the vehicle is forced to stop during running, while the vehicle is prone to still advancing forward due to its inertia. As a result, temporarily, the height of the forward portion of the vehicle body is lowered while the height of the rearward portion of the body is raised to a higher position. A degree of this nose-diving phenomenon may be represented, for example, by a pitch angle indicating an angle of inclination of the body. In this case, too, control over this pitching phenomenon by the active suspension unit may cause some delay in responding to an actual occurrence of the pitch, so that this control cannot sufficiently block the pitching resulting from operation of the brake.

Furthermore, when the steering wheel is operated from the straight running to the left, for example, the vehicle body is caused to roll to the right due to transverse acceleration, thereby lowering the right-hand side portion of the body yet raising the left-hand side portion thereof. A degree of this roll may be represented as a roll angle (or a roll amount) indicating an angle of inclination of the vehicle body in its transverse direction. In using the active suspension unit for control over a roll, i.e., roll control, this control is performed first by determining an actual roll amount on the basis of the ride height of the body on its left side portion and the ride height of the body on its right side portion and changing the actual roll amount so as to reach a target roll amount. Therefore, there should occur a delay in performing the roll control after occurrence of this roll. Therefore, when the steering wheel is rapidly steered and the transverse acceleration is rapidly changed, too, a considerable delay may occur until the actual roll amount is converged to its target roll amount. This rapid operation of the steering wheel may cause a temporary roll to happen.

In summary, as described hereinabove, when driving operation is performed to such an extent that a status amount of the posture of the vehicle body (hereinafter sometimes referred to as a posture status amount), such as a pitch amount or a roll amount of the body, is changed, a considerably large extent of changes in the posture of the vehicle body cannot be avoided inevitably from such driving operation due to a delay in control of the active suspension from the change in the posture of the body.

SUMMARY OF THE INVENTION

The present invention has been completed on the basis of the circumstances as described hereinabove and has the object to provide a suspension apparatus of a vehicle, adapted to quickly respond to occurrence of a running status in such a fashion that a posture status amount such as a pitch amount or a roll amount be varied and thereby to prevent the actual status amount of the posture of the body from altering to a great extent.

In order to achieve the object, the present invention is designed so as to temporarily perform control over the active suspension in anticipation when a running state would be caused to happen to such an extent that changes a posture status amount of the vehicle body. More specifically, as diagrammatically shown in FIG. 19, the present invention consists of a suspension apparatus of a vehicle, comprising: a cylinder unit interposed at each wheel between a sprang weight and an unsprung weight for displacing a ride height by supplying or discharging an operating liquid;

a supply/discharge control valve for independently supplying to or discharging from the cylinder unit;

a plurality of ride height detecting means for independently detecting a ride height of a vehicle body at a position of each wheel;

a status amount determining means for determining an actual status amount of a posture of the vehicle body on the basis of the ride height at the position of each wheel detected by the ride height detecting means;

a posture controlling means for controlling the supply/-discharge control valve so as to allow the actual status amount of the posture of the vehicle body determined by the status amount determining means to reach a given target value;

a driving state detecting means for detecting a driving state which changes acceleration of the vehicle body; and a target value correcting means for correcting the target value so as to cause the posture of the vehicle body to displace in a direction opposite to a direction in which the posture of the vehicle body is caused to displace due to a change of the acceleration of the vehicle body when the driving state which changes acceleration of the vehicle body is detected by the driving state detecting means.

With this arrangement, the present invention can prevent the posture status amount from varying to a large extent by performing control in anticipation for correcting a target value when the running state is detected so as to alter to such an extent to which the status amount of the posture of the vehicle body is changed.

Preferably, a second posture control means is provided for controlling a supply/discharge control valve in such a manner that a displacing velocity is rendered smaller in a direction away from the target value of the posture status amount to be determined by a status amount determining means. The provision of the second posture control means enables a response of control to be rendered quicker and a correction amount associated with this control to be rendered smaller.

Other objects, features and advantages of the present invention will become apparent in the course of the description of the preferred embodiments, which follows, in conjunction with the accompanying drawings.

BRIEF DESCRIPTION OF THE DRAWINGS

FIGS. 4A, 4B and 5 are diagrammatic representations of outlines of systems for performing active control.

DETAILED DESCRIPTION OF THE PREFERRED EMBODIMENTS

Figure 1B:
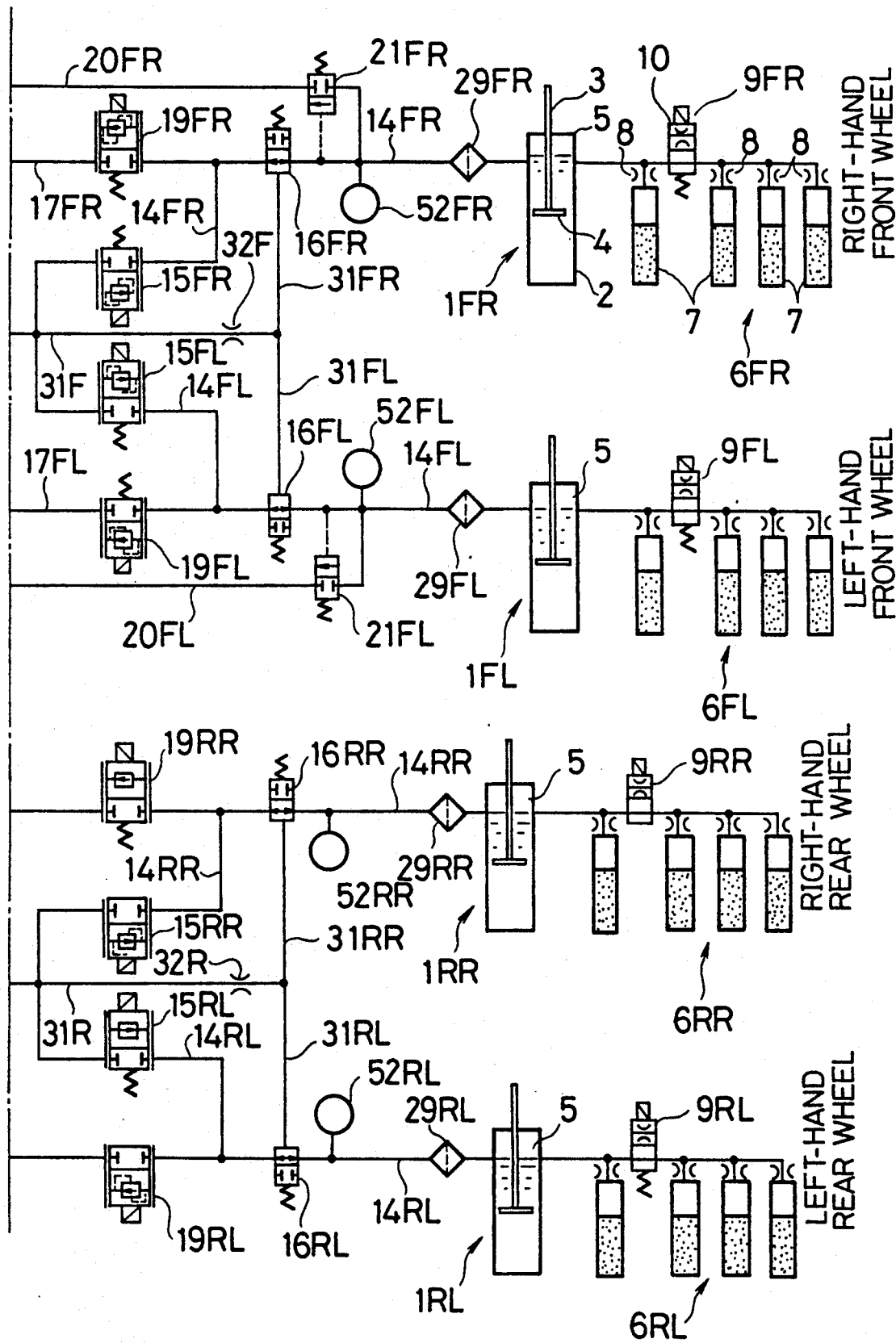
FIG. 1 is a diagrammatic representation of an outline of a circuit of an active suspension.

The present invention will be described more in detail by way of examples in conjunction with the accompanying drawings.

In the following description and the accompanying drawings, reference symbol "F" stands for a front wheel and "R" stands for a rear wheel, as well as reference symbol "FR" stands for a right-hand front wheel, "FL" for a left-hand front wheel, "RR" for a right-hand rear wheel, and "RL" for a left-hand rear wheel. When the front and rear wheels as well as the right-hand and left-hand wheels are not needed to be distinguished, reference numerals are referred to without using these reference symbols.

Operating Liquid Circuit

As shown in FIG. 1, reference numeral 1 denotes a cylinder unit which is mounted to each of the wheels, a cylinder unit mounted to the right-hand front wheel being referred to as 1FR, a cylinder unit mounted to the left-hand front wheel as 1FL, a cylinder unit mounted to the right-hand rear wheel as 1RR, and a cylinder unit mounted to the left-hand rear wheel as 1RL. Each of these cylinder units comprises a cylinder 2 connected to the unsprung weight and a piston rod 3 extending from the inside of the cylinder 2 and connected to a sprang weight. The cylinder 2 comprises the piston rod 3, a piston 4 integral with the piston rod 3, a liquid chamber 5 disposed upward and defined by the piston 4 and a lower chamber disposed downward of the liquid chamber 5 and communicated therewith. This structure allows the piston rod 3 to extend raising a ride height of the vehicle body when an operating liquid is fed to the liquid chamber 5 while lowering the height of the vehicle body when the operating liquid is discharged from the liquid chamber 5.

To the liquid chamber 5 of each cylinder unit 1 is connected a gas spring 6 (6FR, 6FL, 6RR, and 6RL) which comprises four cylindrical springs 7 of a small diameter and the four cylindrical springs 7 are arranged in a row, or in parallel to each other, and connected to the liquid chamber 5 through orifices 8. Three of the four cylindrical springs 7 are further connected to the liquid chamber 5 through a shift valve 9. This arrangement enables the four cylindrical springs 7 to be communicated with each other only through the orifices 8 when the shift valve 9 is located at a shift position as shown in the drawing, thereby making a damping force smaller at this time. When the shift valve 9 is shifted from the position as shown in the drawing the three cylindrical springs 7 can be communicated with each other through an orifice 10 incorporated in the shift valve 9, too, thereby making a damping force larger. It is to be noted as a matter of course that a displacement of the shift positions of the shift valve 9 changes spring characteristics of the gas spring 6. Furthermore, it is to be noted that suspension characteristics can also be changed by an amount of the operating liquid to be fed to the liquid chamber 5 of the cylinder unit 1.

Referring to FIG. 1, reference numeral 11 denotes a pump to be driven by the engine, and the pump 11 raises a high-pressure operating liquid from a reservoir tank 12 and discharges the liquid into a common passage 13 as a supply passage. The common passage 13 is branched into a forward passage 14F and a rearward passage 14R, the forward passage 14F being further branched into a right-hand forward passage 14FR and a left-hand forward passage 14FL. The right-hand forward passage 14FR is connected to the liquid chamber 5 for the right-hand front wheel cylinder unit 1FR and the left hand forward passage 14FL is connected to the liquid chamber 5 of the left-hand front wheel cylinder unit 1FL. To the right-hand forward passage 14FR are connected on the upstream side a flow rate control valve 15FR for supplying the operating liquid and on the downstream side a pilot valve 16FR as a delay valve. To the left-hand forward passage 14FL are connected on the upstream side a flow amount control valve 15FL for supplying and of the downstream side a pilot valve 16FL.

To the right-hand forward passage 14FR is connected a first relief passage 17FR for the right-hand forward passage at a position between the supply flow rate control valves 15FR and 15FL, and the first relief passage 17FR leads eventually to a reservoir tank 12 through a relief passage 18F for the front wheels. To the first relief passage 17FR is connected a discharge flow amount control valve 19FR. The right-hand forward passage 14FR disposed on the downstream side of the pilot valve 16FR is connected through a second relief passage 20FR as a bypass bypassing the discharging flow amount control valve 19FR to the first relief passage 17FR which is connected to a relief valve 21FR. The right-hand forward passage 14FR is provided with a filter 29FR at a position close to the cylinder unit 1FR. The filter 29FR is disposed at a position among the cylinder unit 1FR, the pilot valve 16FR disposed closer to the cylinder unit 1FR, and the relief valve 21FR, functioning as preventing dust abraded or worn off as a result of abrasion and so on from flowing toward the pilot valve 16FR and the relief valve 21FR.

It is to be noted that the arrangement for passages for the left-hand forward wheel is substantially the same as that for the right-hand forward wheel as have been described hereinabove, so that a duplicate description thereon will be omitted herefrom for a brevity of explanation.

To the common passage 13 is connected a main accumulator 22, and to the front-wheel relief passage 18F is connected an accumulator 23F. The main accumulator 22 serves as a source of accumulating pressures for an operating liquid in association with a sub-accumulator 24, as will be described hereinafter, and it functions as preventing an amount of the operating liquid to be supplied to the cylinder unit 1 from running short. The accumulator 23F prevents a high-pressure operating liquid in the cylinder units 1 for the front wheels from being discharged rapidly to the reservoir tank 12 of a low pressure, namely, prevents a so-called water-hammer phenomenon.

Passages for supplying or discharging the operating liquid to or from the cylinder units 1RR and 1RL for the rear wheels are constructed in a way similar to those for the front wheels so that a duplicate description will be omitted from the description which follows. It is to be noted, however, that the passages for the rear wheels are provided with no valves corresponding to the relief valves 21FR and 21FL for the respective cylinder units 1FR and 1FL and that the rear-wheel passage 14R is provided with the sub-accumulator 24 with the fact taken into account that a length of its rear-wheel passage from the main accumulator 22 becomes longer than that of the front-wheel passage.

The common passage 13, namely, each of the front-wheel passage 14F and the rear-wheel passage 14R, is connected to the front-wheel relief passage 18F through a relief passage 25 to which, in turn, is connected a control valve 26 consisting of an electromagnetic switch valve.

In FIG. 1, reference numeral 27 stands for a filter and reference numeral 28 for a pressure governing valve for adjusting a discharge pressure from the pump 11 so as to be within a given range. In this embodiment, the pressure governing valve 28 is constituted such that the pump 11 is of a variable-displacement, sWash plate type piston that is integrally incorporated into the pump 11. The pressure governing valve 28 can adjust the discharge pressure within the range from 120 to 160 $kg/cm^2$.

The pilot valve 16 is arranged so as to be shifted to open or close in accordance with a differential pressure between the pressures of the front-wheel passage 14F or the rear-wheel passage 14R, namely, between the pressure in the common passage 13 and that on the side of the cylinder unit 1. At this end, the front-wheel 14F is led to the front-wheel common pilot passage 31F which, in turn, is branched into two branch passages 31FR and 31FL, and the right-hand front wheel branch passage 31FR is connected to the right-hand pilot valve 16FR while the left-hand branch passage 31FL is connected to the left-hand pilot valve 16FL. The common pilot passage 31F is provided with an orifice 32F. A pilot passage for the rear wheels is arranged like the pilot passage 31F for the front wheels.

Figure 2:
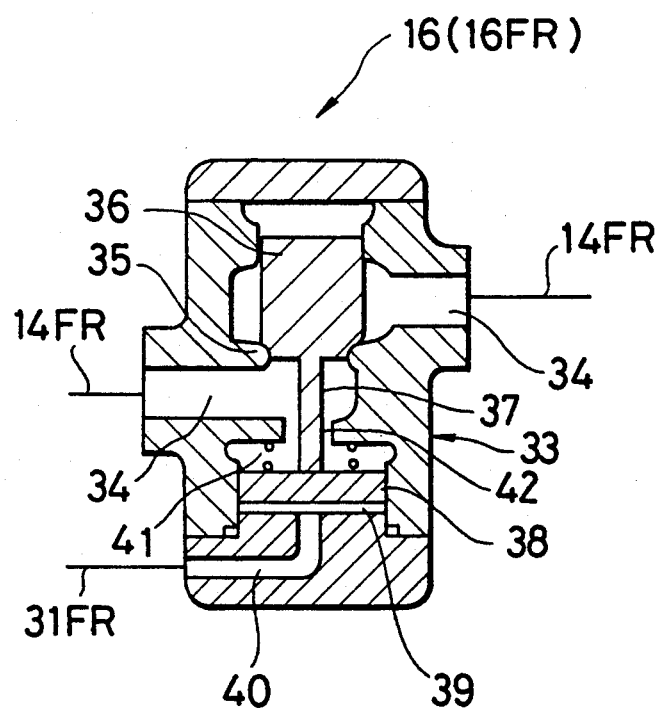
FIG. 2 is a view in section showing an example of a pilot valve of FIG. 1.

Each of the pilot valves 16 may be constructed as shown in FIG. 2. The pilot valve 16 as shown in FIG. 2 is directed to one for the right-hand front wheel, which is provided in a casing 33 with a main flow passage 34 constituting part of the right-hand forward passage 14FR to which the main flow passage 34 is connected. A valve seat 35 is provided in an intermediate position of the main flow passage 34 on or from which a switching piston 36 is seated or separated so as to close or open the piston valve 16FR, the switching piston 36 being slidably inserted into the casing 33.

The switching piston 36 is formed integrally with a control piston 38 through a valve stem 37. The control piston 38 is slidably inserted in the casing 33 and defines a liquid chamber 39 in the casing 33. The liquid chamber 39 is then connected to the branch pilot passage 31FR through a control flow passage 40. The control piston 36 is urged by a return spring 41 in the direction in which the switching piston 36 is being seated on the valve seat 35, in other words, in which the pilot valve 16FR is closed. Furthermore, the control piston 38 is designed such that a pressure of the main flow passage 34 acts upon the control piston 36 through a communication hole 42 on the side opposite to the liquid chamber 39. This arrangement allows the switching piston 36 to be seated on the valve seat 35 to close the pilot valve 16FR as the pressure in the liquid chamber 39 on the side of the common passage 13 has declined to one quarter or less than the pressure in the main flow passage 34 on the side of the cylinder unit 1FR. In this case, when the pressure on the side of the common passage 13 declines to a large extent from a state in which the pilot valve 16FR is open, this decline in the pressure is delayed by means of an action of the orifice 32F and then transmitted to the liquid chamber 39, whereby a closure of the pilot valve 16FR is delayed after the decline in the pressure. It is to be provided that this delay time is set to approximately one second in this embodiment.

Actions of all the valves will be described in more detail hereinafter.

(1) Shift valve 9

The shift valve 9 is shifted to make a damping force greater only during cornering in this embodiment.

(2) Relief valve 21

The relief valve 21 is closed under ordinary conditions and opened as the pressure on the side of the cylinder unit 1 reaches a given value or higher. In this embodiment, the given value is set to 160 to 200 kg/cm². In other words, this valve serves as a safety valve for preventing an abnormal rise in the pressure on the side of the cylinder unit 1.

It is noted that the relief valve 21 may be mounted to the cylinder units 1RR and 1RL for the rear wheels, however, in this embodiment, the relief valve 21 can be mounted on the rear wheels with the fact taken into account that the vehicle body is designed such that the pressure on the side of the rear wheels does not become larger than that on the side of the front wheels on condition that the weight on the front side of the vehicle body is allotted considerably heavier than that on the rear side thereof.

(3) Flow amount control valves 15 and 19

The supply amount rate control valve 15 and the discharge flow amount control valve 19 each are spool valves of electromagnetic type and switched from a closed state to an open state or vice versa. It is provided, however, that there is provided a pressure-differential control mechanism so as to make a difference between the pressure on the upstream side and that on the downstream side substantially constant when they are in an open state, because a constant pressure differential is required for control over a flow amount. More specifically, the flow amount control valves 15 and 19 are designed so as to vary with their positions, i.e., with their opening angles, in which their spools displace in proportion to the current to be supplied. The current to be supplied is determined on the basis of a map in advance prepared and stored, which represents the relationship of the flow amount with the current. In other words, the current is supplied in correspondence with a flow amount required at that time.

The flow amount control valves 15 and 19 controls a supply or discharge of the operating liquid to or from the cylinder unit 1, thereby resulting in control of suspension characteristics.

In addition thereto, when an ignition switch is OFF, only control is carried out for lowering a ride height of the vehicle body for a given period of time (in this embodiment, the period of time being set to two minutes) from the time when the ignition switch was turned OFF. In other words, in order to maintain a reference ride height of the vehicle body, control is implemented to prevent the vehicle's ride height from becoming partially higher upon changes in load resulting from getting out or for other reasons.

(4) Control valve 26

The control valve 26 is closed by excitation at the ordinary time and opened at the fail time. For instance, the fail time may include, for example when a portion of the flow amount control valve 15 or 19 are fixed, when a sensor or other unit, as will be described hereinafter, gets out of order, when the liquid pressure of the operating liquid becomes lost or insufficient, when the pump 11 gets out of order, and so on.

In this embodiment, on top of that, the control valve 26 is opened in a given period of time, for example, in two minutes, after the ignition switch was turned OFF.

It is to be noted herein that, when the control valve 26 is opened, closure of the pilot valve 16 is delayed, as have been described hereinabove.

(5) Pilot valve 16

As have been described hereinabove, the pilot valve 16 is opened in a delayed manner due to the action of the orifices 32F and 32R after the pressure in the common passage 13 has been decreased. At the fail time, for example, when a portion of the flow amount control valves 15 is kept open, this arrangement allows the passages 14FR, 14FL. 14RR and 14RL to be closed on account of a decrease in the pilot pressure resulting from the opening operation of the control valve 26 and confining the operating liquid in the cylinder units 1FR, 1RL, 1RR and 1RL, respectively, thereby maintaining the ride height of the vehicle body. It is noted as a matter of course that suspension characteristics at this time are fixed in a so-called passive fashion.

Control System

Figure 3:
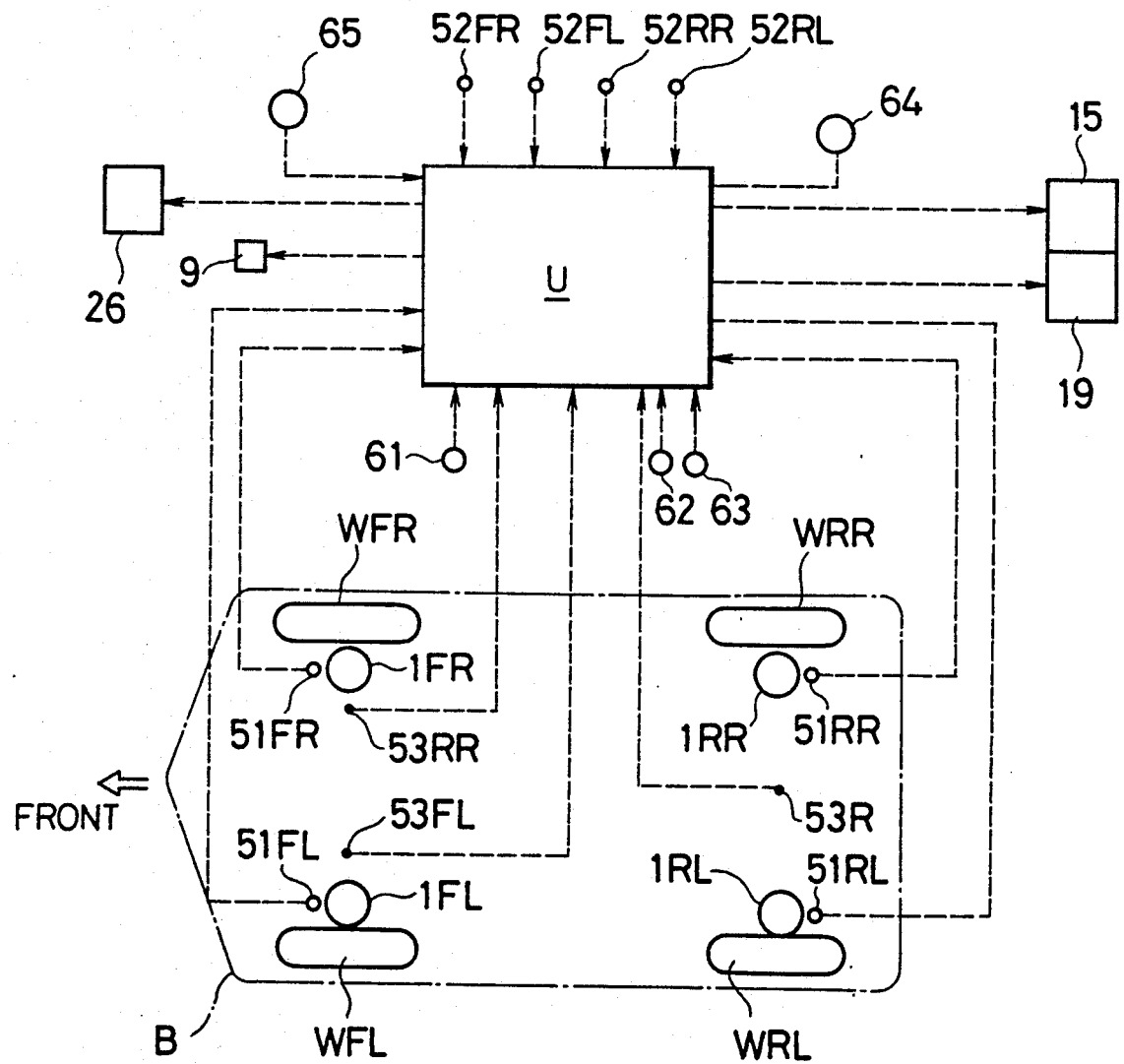
FIG. 3 is a diagrammatic representation of a control system of the circuit of FIG. 1.

FIG. 3 represents a control system of the operating liquid circuit as shown in FIG. 1. In the vehicle, as an automobile, as shown in FIG. 3, reference is made to a rear wheel drive car adapted to allow output from the engine to be transmitted to the rear wheels through the torque converter and the automatic transmission, although each element is not shown herein.

As shown in FIG. 3, reference symbol "WFR" stands for a right-hand front wheel, "WFL" for a left-hand front wheel, "WRR" for a right-hand rear wheel, and "WRL" for a left-hand rear wheel. Reference symbol "U" denotes a control unit comprised of a microcomputer. Signals enter into the control unit U from ride height sensors 51FR, 51FL, 51RR and 51RL, pressure sensors 52FR, 52FL, 52RR, and 52RL, vertical acceleration (G) sensors 53FR, 53FL and 53R, a vehicle speed sensor 61, a steering speed sensor 62, a transverse acceleration sensor 63, an operating-lever position detecting sensor 64, and a brake operation detecting switch 65. The control unit U generates signals to the switch valves 9 (9FR, 9FL, 9RR, 9RL), the supply flow amount control valves 15 (15FR 15FL, 15RR. 15RL), the discharge flow amount control valves 19 (19FR, 19FL, 19RR. 19RL). and the control valve 26.

The ride height sensors 51FR, 51FL, 51RR and 51RL are mounted to the respective cylinder units 1FR, 1FL, 1RR and 1RL and are to detect ride heights in the positions of the respective wheels by sensing an amount of elongation thereof. The pressure sensors 52FR, 52FL, 52RR and 52RL are to sense pressures in the liquid chamber 5 of the respective cylinder units 1FR, 1FL, 1RR and 1RL (see FIG. 1, too). The vertical acceleration sensors 53FR, 53FL and 53R are to sense a vertical acceleration, or acceleration in the vertical direction or a vertical component of acceleration. As will be assumed from the reference symbols, the vertical acceleration sensors 53FR and 53FL are mounted on the forward side of the vehicle B in symmetrical positions on the axis of the front wheels and the vertical acceleration sensor 53R is mounted on the rearward side of the vehicle B on the axis of the rear wheels in a middle position from the left and right sides. This position of the three vertical acceleration sensors defines a one virtual plane representing the vehicle body B, which is an approximately horizontal plane—in other words, so as to be located at substantially the same height. The vehicle speed sensor 61 is to sense a vehicle speed, and the steering speed sensor 62 is to sense a speed of operating the steering wheel, i.e., a steering speed. Actually, the steering angle is detected and the steering angle detected is then calculated to give the steering speed. The transverse acceleration sensor 63 is to sense a transverse acceleration, or acceleration in the transverse direction or a transverse component of acceleration, and it is mounted by only one, in this embodiment, on the Z axis of the vehicle body. The sensor 64 is to sense a position of the operating lever for shifting the speed range positions of the automatic transmission and it can sense the shift from the speed range position P or N to the driving range. The switch 65 is to sense operation of the brake which is to be turned on when a foot brake (not shown) is depressed.

The control unit U basically performs active control, as conceptually shown in FIGS. 4A and 4B. In this embodiment, the active control includes posture control of the vehicle (ride height signal control and ride height displacement speed control), ride comfort control (vertical acceleration signal control), and warp control of the vehicle body (pressure signal control). The results of these control are eventually represented by flow rates or flow amounts of an operating liquid passing through the flow rate control valves 15 and 19.

Active Control

An example of control over the suspension characteristics on the basis of output of each sensor will be described with reference to FIGS. 4A and 4B.

The control content may roughly be broken down into three control modes: control systems X1 and X2 for posture control of the vehicle body B to be performed, respectively, on the basis of output from the ride-height sensor and its differentiated value (ride-height displacement speed), control system X3 for ride comfort control on the basis of output from the vertical acceleration (G) sensors, and control system X4 for warp control of the vehicle body B on the basis of output of the pressure sensor.

(1) Control System X1 (Ride Height Displacement Component)

This control system comprises control over three components of the posture of the body, namely, a bounce component, a pitch component, and a roll component, each of which may be regulated by feedback control by means of P control (proportional control).

Reference numeral 70 denotes a bounce component operation section for operating a bounce component of the vehicle body by adding output XFR from the ride height sensor 51FR on the right-hand front wheel side to output XFL from the ride height sensor 51FL on the left-hand front wheel side, on the one hand, and adding output XRR from the ride height sensor 51RR on the right-hand rear wheel side to output XRL from the ride height sensor 51RL on the left-hand rear wheel side, on the other hand. Reference numeral 71 denotes a pitch component operation section for operating a pitch component of the vehicle body by subtracting the sum of the outputs XRR and XRL on the respective right-hand and left-hand rear wheel side from the sum of the outputs XFR and XFL on the respective right-hand and left-hand front wheel side. Reference numeral 72 denotes a roll component operation section for operating a roll component of the vehicle body by adding the difference between the outputs XFR and XFL on the right-hand and left-hand front wheel side (XFR−XFL) to the difference between the outputs XRR and XRL on the right-hand and left-hand front wheel side (XRR−XRL).

Reference numeral 73 denotes a bounce control section for operating a control amount to the flow rate control valve of each wheel in bounce control on the basis of a gain coefficient KB1 by inputting the bounce component of the vehicle body operated by the bounce component operation section 70 and a target ride height signal TH from a target ride height determining section 91. Reference numeral 74 denotes a pitch control section for operating a control amount to each of the flow rate control valves in pitch control so as to make the ride height corresponding to a target pitch amount TP on the basis of a gain coefficient KP1 by inputting the pitch component of the vehicle body operated by the pitch component operation section 71 and the target pitch amount Tp from a target pitch amount determining section 92. Reference numeral 75 denotes a roll control section for operating a control amount to each flow rate control valve in roll control so as to make the ride height corresponding to a target roll amount TR on the basis of gain coefficients KRF1 and KRR1 by inputting the roll component of the vehicle body operated by the roll component operation section 72 and the target roll amount TR from a target roll amount determining section 93.

In order to control the ride height to a target ride height of the vehicle body, each of the control amounts operated by the control sections 73, 74 and 75 is reversed to make positive to negative or vice versa, i.e. to make it positive or negative so as to be opposite to the respective ride height displacement signals from the ride height sensors 51FR, 51FL, 51RR and 51RL. Then, the bounce, pitch and roll control amounts for each wheel are added thereto, thereby giving a flow rate signal, $Q_{FR1}$, $Q_{FL1}$, $Q_{RR1}$ and $Q_{RL1}$, for the corresponding proportional flow rate control valves for each wheel in the control system X1.

It is to be noted herein that the target ride height or vehicle body height may be represented by a constant value, such as 150 mm, when indicated as the lowest vehicle body height from the ground or be represented by a variable value in a way, for example, such that the lowest vehicle body height is set to 130 mm when the vehicle speed reaches 80 km per hour or higher.

The target pitch amount TP and the target roll amount TR will be described hereinafter.

(2) Control System X2 (Ride Height Displacement Speed Component)

In the control system X2, pitch control and roll control are performed.

Into the pitch control section 78, the pitch component from the pitch component operation section 71 and the target pitch amount TP enter. The pitch control section 78 provides a varying speed at which the pitch component (a difference between the vehicle body height on the front side of the vehicle body and the vehicle body height on the rear side thereof) varies in the direction away from the target pitch amount TP, i.e., a varying amount of signals from the ride height sensors 51FR. 51FL, 51RR and 51RL per sampling time period (in this embodiment, every 10 msec). And the control flow rate to each flow rate control valve is determined by using a control gain KP2 so as to make the varying speed slower in the direction of increasing the pitch amount.

Into the roll control section 79, a roll amount (a roll angle) from the roll amount operation section 72 and a target roll amount TR from a target roll amount determining means enter. The roll control section 79 determines a control flow rate to each of the flow rate control valves by using a control gain KRF3 or KRR2 in order to make a varying speed of an actual roll amount in the direction away from the target roll amount TR for each set of the left-hand and right-hand front wheels and the left-hand and right-hand rear wheels.

The control amounts determined by the control sections 78 and 79 are reversed to be made positive or negative and thereafter they are added to each other for each flow rate control valve (each cylinder unit 1FR, 1FL, 1RR and 1RL), thereby giving a control flow rate $Q_{FR2}$, $Q_{FL2}$, $Q_{RR2}$ and $Q_{RL2}$ in the control system X2. It is noted herein that reference symbol "S" indicated in the control sections 78 and 79 denotes an operator.

(3) Control System X3 (Vertical Acceleration Component)

Reference numeral 80 denotes a bounce component operation section for operating a bounce component of the vehicle body by totalling outputs GFR, GFL and GR from the respective three vertical acceleration sensors 53FR, 53FL and 53R. Reference numeral 81 denotes a pitch component operation section for operating a pitch component of the vehicle body by subtracting the output GR on the rear wheel side from the sum of halves of the outputs GFR and GFL on the respective right-hand and left-hand front wheel side. Reference numeral 82 denotes a roll component operation section for operating a roll component of the vehicle body by subtracting the output GFL on the left-hand front wheel side from the output GFR on the right-hand front wheel side.

Reference numeral 83 stands for a bounce control section for operating a control amount to the flow rate control valve of each wheel in bounce control on the basis of a gain coefficient KB3 by inputting the bounce component of the vehicle body operated by the bounce component operation section 80. Reference numeral 84 stands for a pitch control section for operating a control amount to the flow rate control valve of each wheel in pitch control on the basis of a gain coefficient KP3 by inputting the pitch component of the vehicle body operated by the pitch component operation section 81. Reference numeral 85 stands for a roll control section for operating a control amount to the flow rate control valve of each wheel in roll control on the basis of a gain coefficient KRF3 or KRR3 by inputting the roll component of the vehicle body operated by the roll component operation section 82.

In order to control vibration of the vehicle body in the vertical direction by the bounce, pitch and roll components, each of the control amounts operated by the control sections 83, 84 and 85 is reversed to be made positive or negative for each wheel and the bounce, pitch and roll control amounts are added to each other, thereby giving flow rate signals, $Q_{FR3}$, $Q_{FL3}$, $Q_{RR3}$ and $Q_{RL3}$ for the respective proportional flow rate control valves in the control system X3.

(4) Control System X4

A warp control section 90 comprises a liquid pressure ratio operation section 90a on the front wheel side and a liquid pressure ratio operation section 90b on the rear wheel side.

The liquid pressure ratio operation section 90a on the front wheel side operates a ratio of the difference in liquid pressure between the right-hand front wheel and the left-hand front wheel (PFR−PFL) to the sum of the liquid pressures on the front wheel side (PFR+PFL), i.e., (PFR−PFL)/(PFR+PFL), by means of inputs of liquid pressure signals PFR and PFL from the two liquid pressure sensors 52FR and 52FL on the front wheel side. The liquid pressure ratio operation section 90b on the rear wheel side likewise operates a liquid pressure ratio on the rear wheel side, i.e., (PRR−PRL)/(PRR+PRL).

The liquid pressure ratio on the rear wheel side is then multiplied by a gain coefficient $\omega F$ to give desired magnifications which in turn are subtracted from the liquid pressure ratio on the front wheel side. The difference is then multiplied by the gain coefficient $\omega F$ and further the results on the front wheel side are multiplied by a gain coefficient $\omega C$. The control amounts for each wheel are reversed so as to be made uniform between the left-hand and right-hand wheels, thereby giving flow rate signals $Q_{FR4}$, $Q_{FL4}$, $Q_{RR4}$ and $Q_{RL4}$ of the respective flow rate control valves in the control system X4.

(5) Control Systems X1, X2, X3 and X4

The ride height displacement components $Q_{FR1}$, $Q_{FL1}$, $Q_{RR1}$ and $Q_{RL1}$. the ride height displacement speed component $Q_{FR2}$, $Q_{FL2}$, $Q_{RR2}$ and $Q_{RL2}$, the vertical acceleration component $Q_{FR3}$, $Q_{FL3}$, $Q_{RR3}$ and $Q_{RL3}$, and the pressure component $Q_{FR4}$, $Q_{FL4}$, $Q_{RR4}$ and $Q_{RL4}$ of the flow rate signals determined for each flow rate control valve were eventually added to each other for each wheel, thereby finally giving total flow rate signal $Q_{FR}$, $Q_{FL}$, $Q_{RR}$ and $Q_{RL}$.

Figure 5:
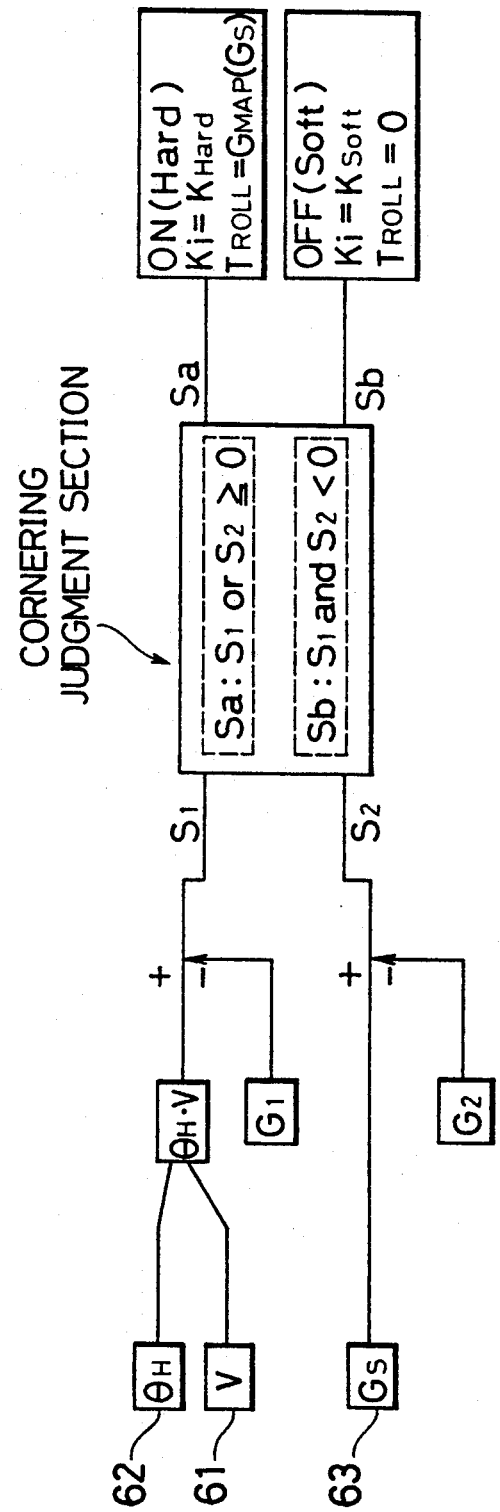

The control gains used for explanation of FIGS. 4A and 4B as described hereinabove are switched by the control systems as shown in FIG. 5.

First, the steering speed $\theta H$ of the steering wheel is multiplied by the vehicle speed V, and a value S1 obtained by operating a reference value G1 from the product $\theta H \cdot V$ and inputted into a cornering judgment section. Further, a value S2 obtained by subtracting a reference value G2 from the current transverse acceleration GS of the vehicle body enters into the cornering judgment section.

Figure 6:
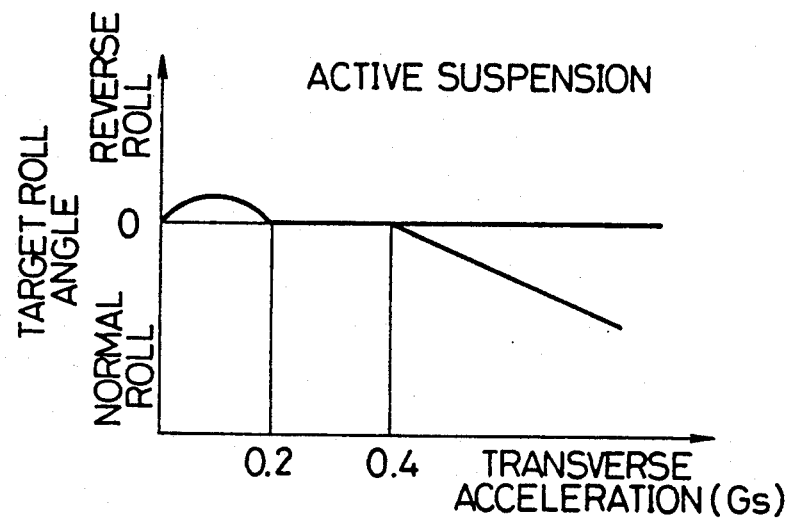
FIG. 6 is a graph showing an example of a roll characteristic in the vehicle with active suspension.
Figure 7:
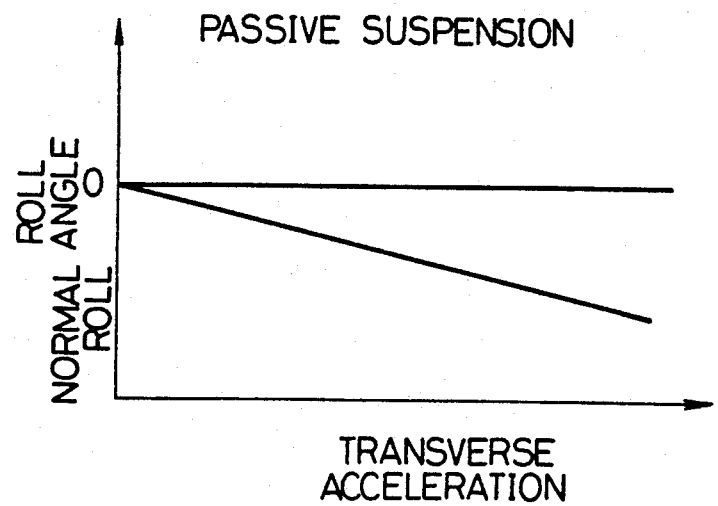
FIG. 7 is a graph showing an example of a roll characteristic in the vehicle with passive suspension.

The cornering judgment section decides the vehicle as cornering when the input S1 or S2 is equal to or larger than zero, thereby generating a HARD signal Sa of the suspension characteristics. Upon output of the signal Sa, in order to improve followability of flow rate control for each liquid pressure cylinder 1, a damping force switching valve 10 is switched to a restricted position and each of control gains Ki is set to KHard and the target roll angle TR is set to the transverse acceleration Gs at that time from a pre-stored map. FIG. 6 shows an example of the map. For instance, in the case of a passive suspension vehicle, the transverse acceleration increases as the roll angle (normal roll) gets larger, as shown in FIG. 7.

When the input S1 or S2 is smaller than zero, the cornering judgment section decides the vehicle as running straight and generates a SOFT signal Sb of the suspension characteristics, thereby switching the damping force switching valve 10 to its open position and setting the control gain Ki to normal value Ksoft and the target roll angle to zero (TR=0).

Control of Squat Prevention

Description will now be made of control for preventing a squat from occurring at the time when range positions have been shifted, i.e., when the range position P or N has been shifted to the running speed range position.

This squatting phenomenon appears as a phenomenon in which the height of the vehicle body on its forward side becomes higher while the vehicle body height on its rearward side becomes lower because the rear wheels WRR and WRL are driven in this embodiment. From this point of view, the target pitch amount Tp is corrected for a given period of time (for example, for 2 seconds) from the point of time when the sensor 64 has sensed the shifting to the running speed range position, so as to make the vehicle body height on its forward side lower while making the vehicle body height on its rearward side higher by the pitch control in the control systems X1 and X2 as described hereinabove.

Figure 8:
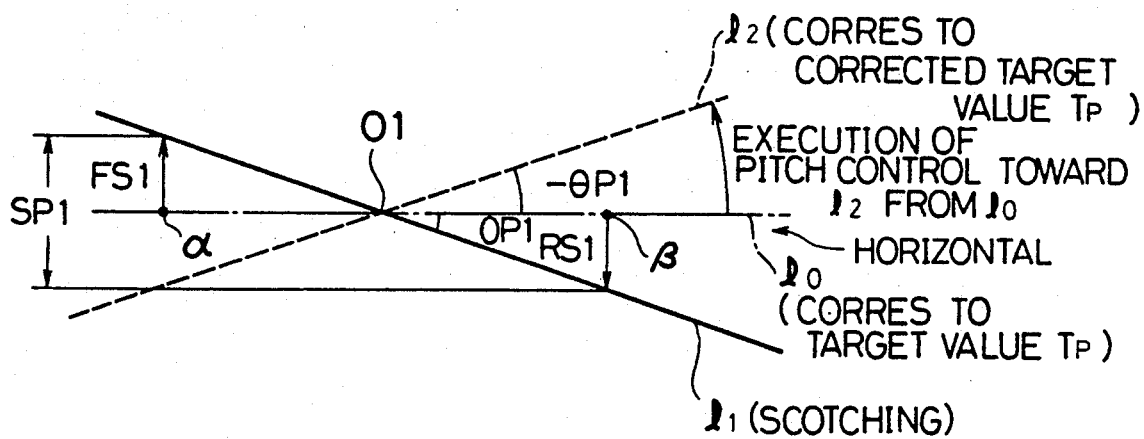
FIG. 8 is a diagrammatic representation showing a control content for a squat prevention according to the present invention.

Description will be made on the correction of the pitch amount Tp in conjunction with FIG. 8. As shown in FIG. 8, reference symbols 10, 11 and 12 denote the lines parallel to the longitudinal direction of the vehicle body; reference symbol $\alpha$ denotes the position of the front wheel, reference symbol $\beta$ denotes the position of the rear wheel, and reference symbol 01 denotes the center between the positions of the front and rear wheel positions $\alpha$ and $\beta$. Given the foregoing, the target pitch amount Tp is usually set to zero, i.e., the position $\alpha$ being equal or identical to the position $\beta$ (the same vehicle body height), and the line of the longitudinal direction of the body at this time is 10.

Assuming that the forward portion of the vehicle body is made higher by FS1 while the rearward portion of the vehicle body is made lower by RS1 i.e., $|FS1|=|RS1|$, due to the squat phenomenon, the longitudinal direction of the vehicle body is displaced as represented by 11. The actual pitch amount at this time is SP1 when represented by a stroke value and $\theta P1$ when represented by an angle. In accordance with the present invention, in order to prevent the longitudinal direction of the vehicle body from displacing from 10 to 11, the pitching is provided in the direction of offsetting the pitching being caused at the time of squatting, by correcting the target pitch amount Tp. In other words, the target pitch amount Tp is corrected in the direction as represented by 12 for a given time period, in synchronization with shifting the range positions. This correction allows the pitch control section 74 as shown in FIG. 4A to perform control for lowering the forward portion of the vehicle body while raising the rearward portion of the body thereby resulting in a negation of the squatting phenomenon.

In the pitch control section 78 of FIG. 4A, when the corrected target pitch amount Tp becomes corresponding to the longitudinal direction 12, the longitudinal direction 10 is controlled so as to coincide with the longitudinal direction 12. A control amount at this time becomes larger as an amount of displacing from the longitudinal direction 10 to the longitudinal direction 12 per unit time, i.e., a displacing velocity gets larger. The displacement of the longitudinal direction of the body from 10 to 12 is performed immediately upon shifting of the speed range positions—in other words, this displacement has been performed for an extremely short time period as short as a sampling interval of output signals from the rideheight sensors 51FR, 51FL, 51RR and 51RL—so that the displacing speed becomes extremely large. Further, as the displacement of the longitudinal direction of the body from 10 to 12 is executed immediately insynchronization with the shifting of the range positions, control for a squat prevention is started up rapidly by the pitch control section 78. Hence, the amount of correction in the direction from 10 toward 12 (the corrected target pitch amount Tp) may actually be so small that it is advantageous from the point of view of preventing the control after the suspension of correction of the target pitch amount from hatching.

Control on alteration of the target pitch amount Tp will now be described with reference to the flow charts as shown in the accompanying drawings.

FIG. 9

Figure 9:
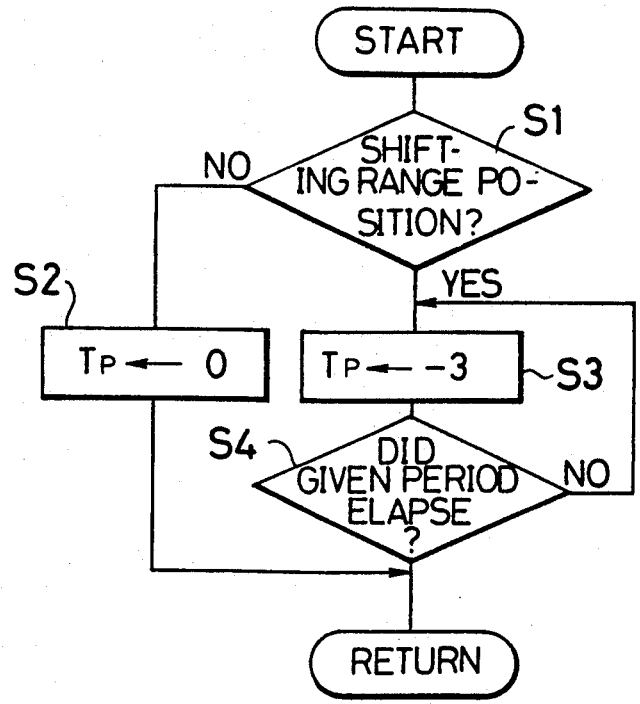
FIGS. 9 and 10 are flow charts for performing control of FIG. 8.

FIG. 9 indicates an embodiment in which the target pitch amount Tp is corrected to a constant value for a given period of time.

First, at step S1, it is determined whether or not it is the time when the range position P or N be shifted to the running speed range. If the determination at step S1 is NO, on the one hand, the flow proceeds to step S2 and the target pitch amount Tp is set to zero. Then the control ends.

If it is determined at step S1 that it is the time for shifting the range position P or N to the running speed range, on the other hand, the target pitch amount Tp is set at step S3 to minus 3 ($-3$). This figure in this embodiment indicates the magnitude of correction toward the direction 12 of FIG. 8 as a ride-height displacement amount represented in mm. Thereafter, at step S4, it is then determined whether or not a given period of time (for example, 2 seconds) has elapsed from the point of time when the decision at step S1 was found YES. If the decision at step S4 is NO, on the one hand, then the flow is returned to step S3. If the decision at step S4 is YES, on the other, control ends at the time when the decision was YES at step S4.

FIG. 10

Figure 10:
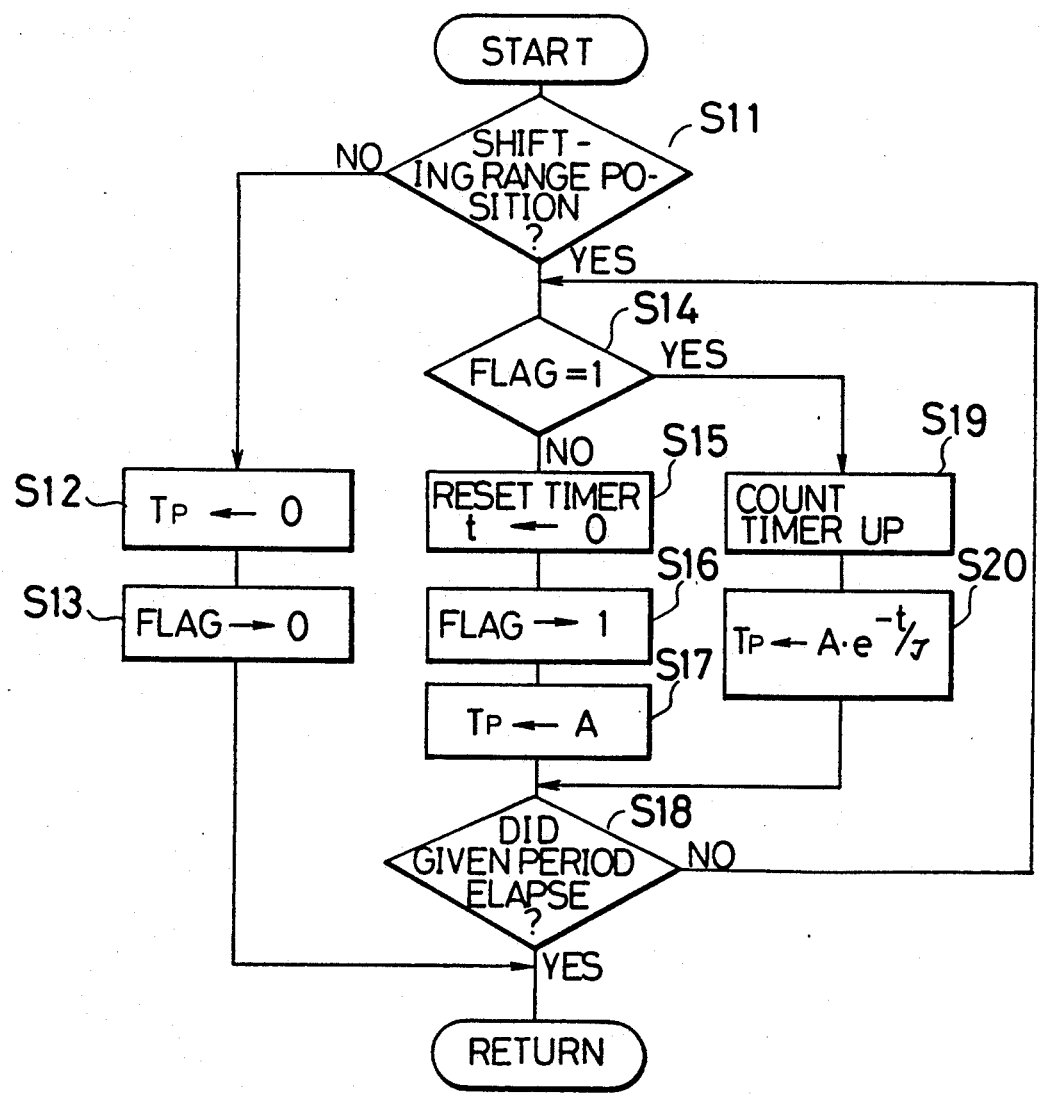

In an example as shown in FIG. 10, an initial value immediately after the shifting of the range positions is set to a slightly larger value and the initial value is decreased in an exponential-funCtional manner as time passes by.

First, at step S1, it is determined whether or not it is the time when the range position be shifted in the same manner as in step S1. If the decision at step S11 is No, then the flow advances to step S12 where the target pitch amount Tp is reset to zero and then at step S13 flag is reset to zero, too, thereby ending the control.

If the decision is YES at step S11, then the flow proceeds to step S14 and it is there determined whether or not the flag is set to 1. As the flag is zero immediately after the flow has transferred to step S14 from step S11, a count value of the timer at this time has been reset to zero at step S15 and the flag is set to 1 at step S16. Thereafter, at step S17, the target pitch amount Tp is set to the initial value A (corresponding to a value set at step S3 of FIG. 9 and being 10 mm as a value corresponding to the amount of pitch actually occurred).

Figure 11:
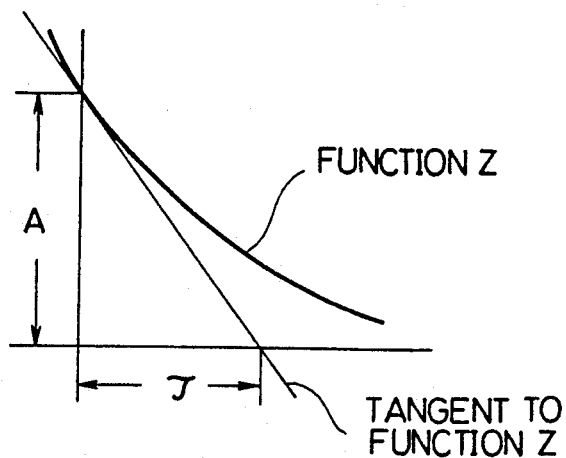
FIG. 11 is a graph indicating the meaning of the damping formula to be used in the control of FIG. 10.

At step S18 after step S17, it is determined whether or not a given period of time has elapsed from the time of point when the decision was made YES at step S11 (actually, when the time was reset at step S15). When the decision at step S18 is NO, the flow is returned to step S14, however, the decision at step S14 at this time is made YES followed by transferal to step S19. At step S19, the timer is counted up and, then at step S20, the target pitch amount Tp is set according to the damping formula as shown at step S20 in FIG. 10, thereby reducing the target pitch amount Tp. The symbol $v$ in the damping formula is as shown in FIG. 11. The flow advances to step S18 after step P20. When the decision at step S18 is YES, control ends.

FIG. 9, on the one hand, indicates the instance which is suitable for the case where the corrected pitch amount is small, i.e., for the case where the pitch control using displacement speed signals is employed in combination with other control. FIG. 10, on the other hand, indicates the instance which is suitable for the case where the corrected pitch amount is large and the pitch control is performed by the displacement signal only.

Control of Nose-Diving Prevention at Braking

Description will now be made of control for preventing a nose dive from occurring due to braking.

This nose diving phenomenon appears as a phenomenon in which the height of the vehicle body on its forward side becomes lower while the vehicle body height on its rearward side becomes higher. From this point of view, the target pitch amount Tp is corrected for a given period of time when the switch is turned on, i.e., when the braking is under way, so as to make the vehicle body height on its forward side higher while making the vehicle body height on its rearward side lower by the pitch control in the control systems X1 and X2 as described hereinabove.

Figure 12:
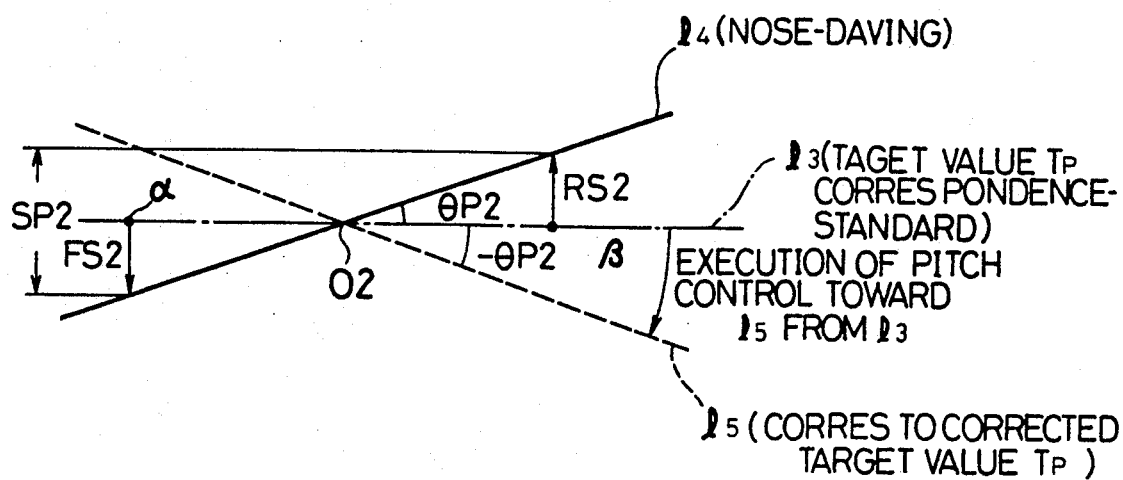
FIG. 12 is a diagrammatic representation showing a control content for a dive prevention according to the present invention.

Description will be made on the correction of the pitch amount Tp in conjunction with FIG. 12. As shown in FIG. 12, reference symbols 13, 14 and 15 denote the lines parallel to the longitudinal direction of the vehicle body; reference symbol $\alpha$ denotes the position of the front wheel, reference symbol $\beta$ denotes the position of the rear wheel, and reference symbol O2 denotes the center between the positions of the front and rear positions $\alpha$ and $\beta$. Given the foregoing, the target pitch amount Tp is usually set to zero, i.e., the position $\alpha$ being equal or identical to the position $\beta$ (the same vehicle body height), and the line of the longitudinal direction of the body at this time is 13.

Assuming that the forward portion of the vehicle body is made lower by FS2 while the rearward portion of the vehicle body is made higher by RS2, i.e., $|FS2| = |RS2|$, due to the nose dive phenomenon, the longitudinal direction of the vehicle body is displaced as represented by 14. The actual pitch amount at this time is SP2 when represented by a stroke value and $\theta$P2 when represented by an angle. In accordance with the present invention, in order to prevent the longitudinal direction of the vehicle body from displacing from 13 to 14, the pitching is provided in the direction of offsetting the pitching being caused at the time of nose-diving, by correcting the target pitch amount Tp. In other words, the target pitch amount Tp is corrected in the direction as represented by 15 in synchronization with braking. This correction allows the pitch control section 74 as shown in FIG. 4A to perform control for raising the forward portion of the vehicle body while lowering the rearward portion of the body, thereby resulting in a negation of the nose diving phenomenon.

In the pitch control section 78 of FIG. 4A, when the corrected target pitch amount Tp becomes corresponding to the longitudinal direction 15, the longitudinal direction 13 is controlled so as to coincide with the longitudinal direction 15. A control amount at this time becomes larger as an amount of displacing from the longitudinal direction 13 to the longitudinal direction 15 per unit time, i.e., a displacing velocity, gets larger. The displacement of the longitudinal direction of the body from 13 to 15 is performed immediately upon braking operation. In other words, this displacement has been performed for an extremely short time period as short as a sampling interval of output signals from the ride height sensors 51FR, 51FL, 51RR and 51RL, so that the displacement velocity becomes extremely large. Further, as the displacement of the longitudinal direction of the body from 13 to 15 is executed immediately in synchronization with the braking operation, control for a nose dive prevention is rapidly started up by the pitch control section 78. Hence, the amount of correction in the direction from 13 toward 15 (the corrected target pitch amount Tp) may actually be so small that it is advantageous from the point of view of preventing the control after the suspension of correction of the target pitch amount from hatching.

Control on alteration of the target pitch amount Tp will now be described with reference to the flow charts as shown in the accompanying drawings.

FIG. 13

Figure 13:
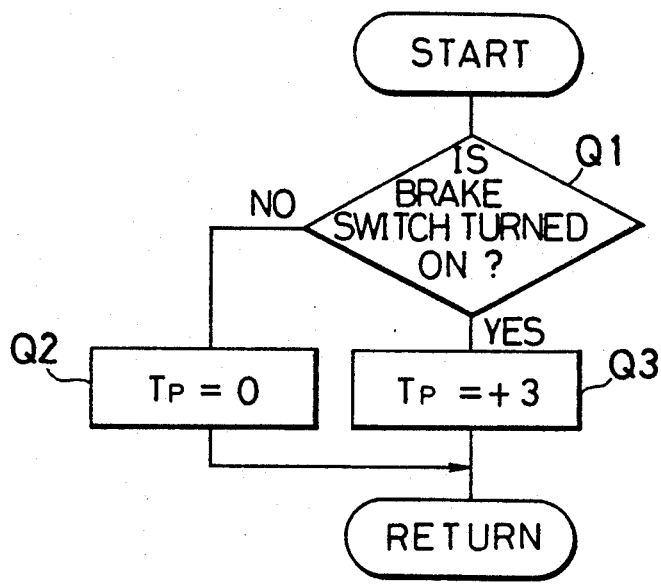
FIGS. 13 and 14 are flow charts for performing control of FIG. 12.

FIG. 13 indicates an embodiment in which the target pitch amount Tp is corrected to a constant value for the entire period of time during braking.

First, at step Q1, it is determined whether or not a brake switch 65 is turned on, namely, it is under braking. If the determination at step Q1 is NO, on the one hand, the flow proceeds to step Q2 and the target pitch amount Tp is set to zero. Then the control ends.

If it is determined at step Q1 that the brake switch 65 is under braking, on the other hand, the target pitch amount Tp is set at step Q3 to plus 3 (+3). This figure in this embodiment indicates the magnitude of correction toward the direction 15 of FIG. 12 as a ride-height displacement amount represented in mm.

FIG. 14

Figure 14:
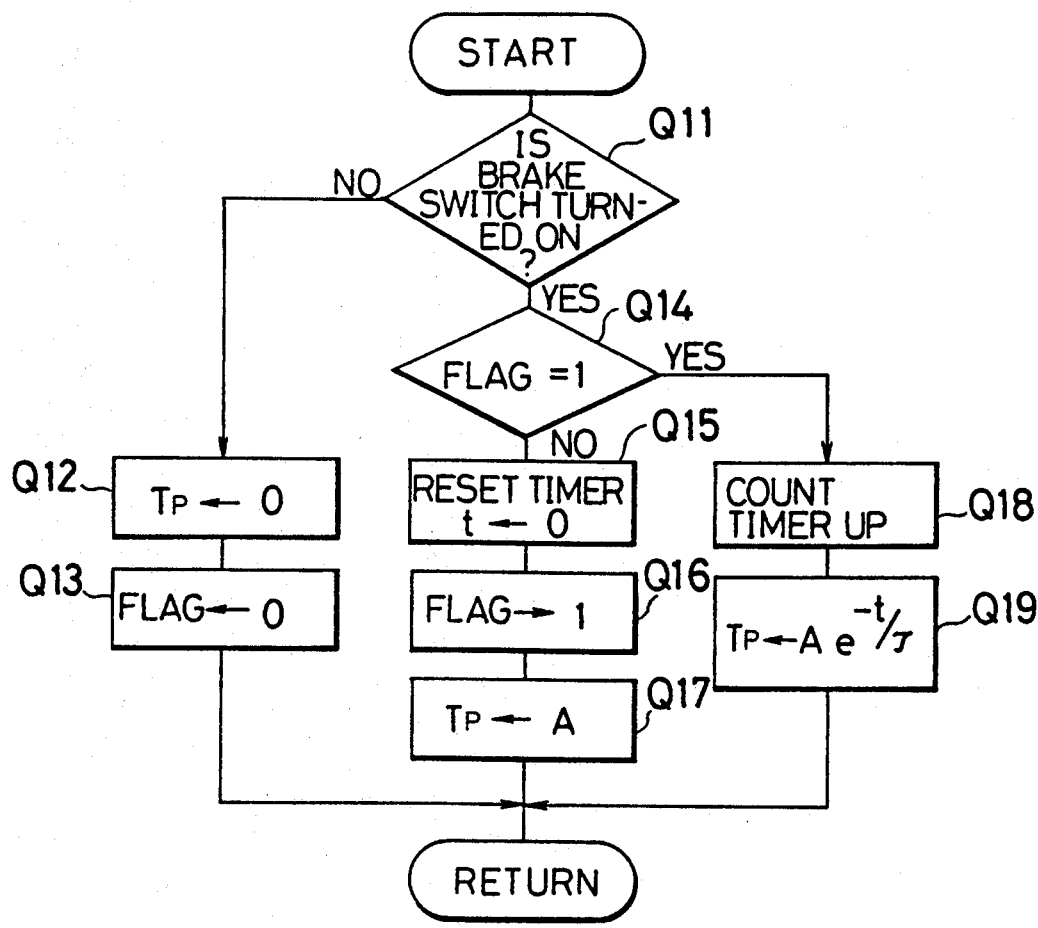

In an example as shown in FIG. 14, an initial value at the time of startup of the braking operation is set to the largest value and the initial value is decreased in an exponential-functional manner as time passes by.

First, at step Q11, it is determined whether or not the brake switch 65 is under braking. If the decision at step Q11 is NO, then the flow advances to step Q12 where the target pitch amount Tp is reset to zero and then at step Q13 flag is reset to zero, too, thereby ending the control.

If the decision is YES at step Q11, then the flow proceeds to step Q14 and it is there determined whether or not the flag is set to 1. As the flag is zero immediately after the flow has transferred to step Q14 from step Q11, a count value of the timer at this time has been reset to zero at step Q15 and the flag is set to 1 at step Q16. Thereafter, at step Q17, the target pitch amount Tp is set to the initial value A (corresponding to a value set at step S3 of FIG. 9 and being 10 mm as a value corresponding to the amount of pitch actually occurred).

As long as the brake switch is being turned on, the flow is returned to step Q14 again, however, the decision at step Q14 at this time is made YES followed by transferal to step Q18. At step Q19, the timer is counted up and, then at step S19, the target pitch amount Tp is set according to the damping formula as shown at step S19 in FIG. 14, thereby reducing the target pitch amount Tp. The symbol $\tau$ in the damping formula is as shown in FIG. 11.

FIG. 13, on the one hand, indicates the instance which is suitable for the case where the corrected pitch amount is small, i.e., for the case where the pitch control using displacement speed signals are employed in combination with other control. FIG. 14, on the other hand, indicates the instance which is suitable for the case where the corrected pitch amount is large and the pitch control is performed by the displacement signal only.

Control of Temporary Roll Prevention

Description will now be made of control for preventing a temporary roll from occurring in conjunction with FIG. 15.

Figure 15:
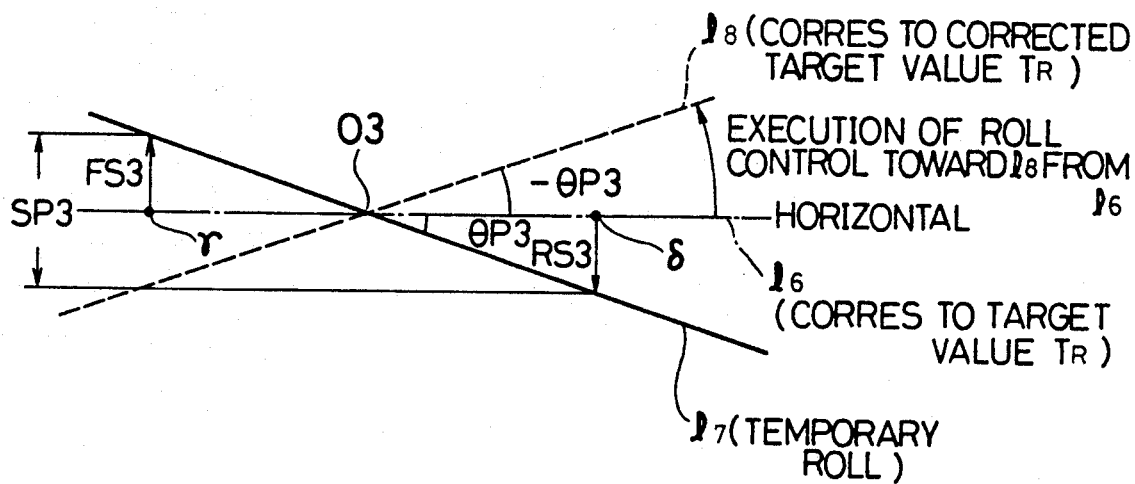
FIG. 15 is a diagrammatic representation showing a control content for a prevention of a temporary roll according to the present invention.

As shown in FIG. 15, reference symbols 16, 17 and 18 denote the lines parallel to the transverse direction of the vehicle body; reference symbol $\gamma$ denotes the position of the left side of the vehicle body, reference symbol $\delta$ denotes the position of the right side of the body, and reference symbol O3 denotes the center between the positions $\gamma$ and $\delta$. Given the foregoing, the target roll angle TR is usually set to zero and the line of the transverse direction of the body at this time is 16.

Assuming that the steering wheel is rapidly steered to the left, a roll may be caused to occur due to a rapid occurrence of the transverse acceleration directed to the right, thereby causing to make the left-hand side portion of the body higher by FS3 while lowering the right-hand side portion of the body by RS3, i.e., $|FS3|=|RS3|$, as displaced as indicated by the transverse direction 17. The actual roll amount at this time is SP3 when represented by a stroke value and $\theta$P3 when represented by an angle. The maximum roll amount (SP3 or $\theta$P3) to be caused to occur at this time may temporarily deviate to a large extent from the target roll amount as indicated in FIG. 6, due to an influence of a temporary roll.

In accordance with the present invention, in order to prevent a roll in the transverse direction of the body from 16 to 17, a roll is provided in the direction of offsetting the roll resulting from a variation in the transverse acceleration, by correcting the target pitch amount TR. In other words, the target roll amount TR is temporarily corrected in the direction as represented by 18 in synchronization with detecting a rapid operation of the steering wheel. This correction allows the roll control section 75 as shown in FIG. 4A to perform control for lowering the left-hand side portion of the vehicle body while raising the right-hand side portion of the body, thereby preventing a temporary roll, i.e., an excessive change in the roll amount.

In the roll control section 79 of FIG. 4A, when the corrected target roll amount TR becomes corresponding to the transverse direction 18, the transverse direction 16 is controlled so as to coincide with the transverse direction 18. A control amount at this time becomes larger as an amount of displacing from the transverse direction 16 to the transverse direction 18 per unit time, i.e., a displacing velocity, gets larger. The displacement of the transverse direction of the body from 16 to 18 is performed immediately upon detection of the rapid operation of the steering wheel—in other words, this displacement has been performed for an extremely short time period as short as a sampling interval of output signals from the ride height sensors 51FR, 51FL, 51RR and 51RL—so that the displacing velocity becomes extremely large. Further, as the displacement of the transverse direction of the body from 16 to 18 is executed immediately in synchronization with detection of the rapid operation of the steering wheel, control for a prevention of a temporary roll is started up rapidly by the roll control section 79. Hence, the amount of correction from 16 toward 18 (the corrected target roll amount TR) may actually be so small that it is advantageous from the point of view of preventing the control after the suspension of correction of the target roll amount from hatching.

Control on alteration of the target roll amount TR will now be described with reference to the flow charts as shown in the accompanying drawings.

FIG. 16

First, at step R1, a steered angle $\theta$H, a steering speed $\theta$H·S as a differentiated value of the steered angle, and a vehicle speed V are entered.

At step R2, it is determined whether or not the steering speed $\theta$H·S is slower than a given value—in other words, whether the driving status is not affected by a so-called temporary roll. If the decision at step R2 is YES, on the one hand, a target roll amount TR is determined on the basis of a map as shown in FIG. 6.

If it is determined at step R2 that the driving status is affected by the temporary roll, on the other hand, the magnitude of the transverse acceleration YG1 is determined at step R4 from a map which has been previously prepared and stored on the basis of the steering speed $\theta$H·S and the vehicle speed V. Then at step R5, it is determined whether the magnitude of the transverse acceleration is smaller than 0.3 (0.3 G). When the decision at step R5 is YES, on the one hand, the target roll amount TR is set to zero as it is found that no temporary roll adversely affects.

When the decision at step R5 is NO, on the other hand, it is then determined at step R8 whether or not YG1 is smaller than 0.5. If YES at step R8, the target roll amount TR is set at step R9 to plus 5 (+5) (a correction amount toward 18 and indicating a value in mm, which corresponds to a stroke amount SP3, in this embodiment). When the decision is NO at step R8, the flow proceeds to step R 10 where the target roll amount TR is set to plus 3 (+3) (smaller than the set value at step R9) as it is found to be the time when a transverse acceleration would occur to such an extent as being closer to limit performance of the tires.

Figure 17:
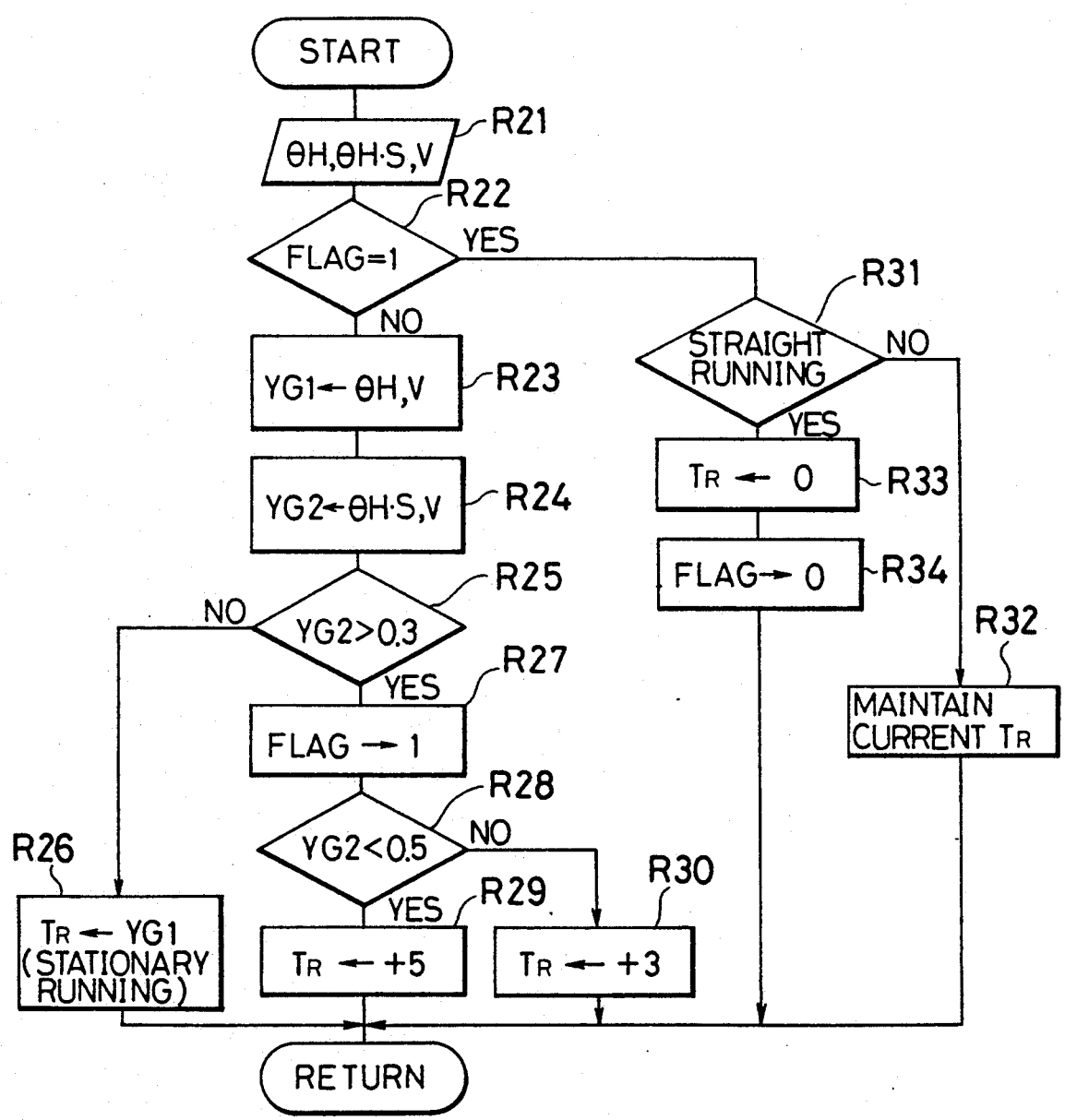

After steps R6, R8 or R10, it is then determined at step R7 whether the vehicle runs in a straight direction. It is decided at step R7 that the vehicle runs straight when the steered angle $\theta$H is nearly zero and the steering speed $\theta$H·S is nearly zero, too. When the decision at step R7 is NO, the flow returns again to step R5. And when the decision at step R7 turned out to be YES, the target roll amount TR is set to zero at step R11 in order to suspend the control over prevention of a temporary roll. FIG. 17

In an example as shown in FIG. 17, the magnitude of the transverse acceleration to be used in FIG. 6 are determined by the steered angle θH and the vehicle speed V, without the use of output from the sensor 63.

First, at step R21, the steered angle θH, the steering speed θH·S, and the vehicle speed V are read, and at step R22, it is determined whether the flag is set to 1. It is to be noted herein that the flag being 1 means that control for preventing a temporary roll is under way.

When the decision at step R22 is NO, on the one hand, the flow proceeds to step R23 where the magnitude of a first transverse direction YG1 is determined from the map previously prepared and stored on the basis of the steered angle θH and the vehicle speed V and, then at step R24, the magnitude of a second transverse acceleration YG2 is determined from the map previously formed and stored on the basis of the steering speed θH·S and the vehicle speed V.

Then at step R25, it is determined whether the magnitude of transverse acceleration YG2 is larger than 0.3. When the decision at step R25 is NO, on the one hand, the value YG1 is used as a transverse acceleration and the target roll amount TR is determined according to FIG. 6.

When the decision at step R25 is YES, on the other hand, the flag is set to 1 at step R27 and it is then determined at step R28 whether or not the value YG2 is smaller than 0.5. When it is determined that the value YG2 is smaller than 0.5 at step R28, the target roll amount TR is set at step R29 to plus 5 (+5). And when the decision at step R28 is NO, the target roll amount TR is set at step R30 to plus 3 (+3).

When the decision at step R22 is YES, it is determined at step R31 whether or not the vehicle runs straight. If the decision at step R31 is NO. the flow proceeds to step R32 and the latest target roll amount TR is set to the current target roll amount TR. When the decision at step R31 is YES, the target roll amount TR is set to zero and the flag is set to zero, too, at step R34, thereby suspending the control for prevention of a temporary roll.

In performing roll control using the displacement signal and the displacement speed signal, a correction amount as much as 3 to 5 mm can prevent the temporary roll to a sufficient extent. In performing the roll control using the displacement signal only, the correction amount should be as much as 10 mm equivalent of the amount of temporary roll to be caused in such a state that no control is performed. Hence, when the displacement speed signal is used in combination, the reverse roll that occurs during stationary cornering is as small as the passenger cannot perceive, thereby improving stability in driving.

Figure 16:
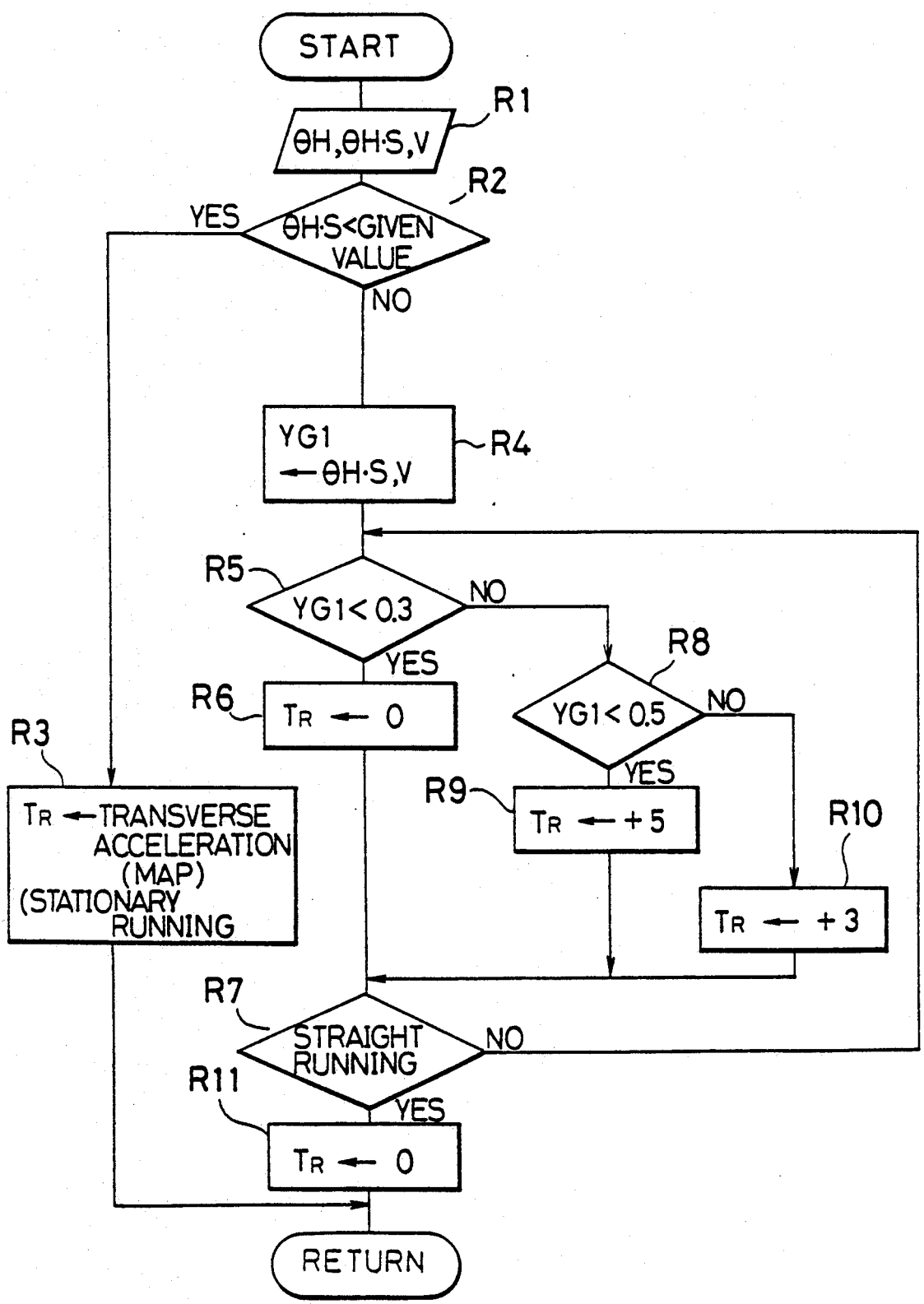
FIGS. 16 and 17 are flow charts for performing control of FIG. 15.
Figure 18:
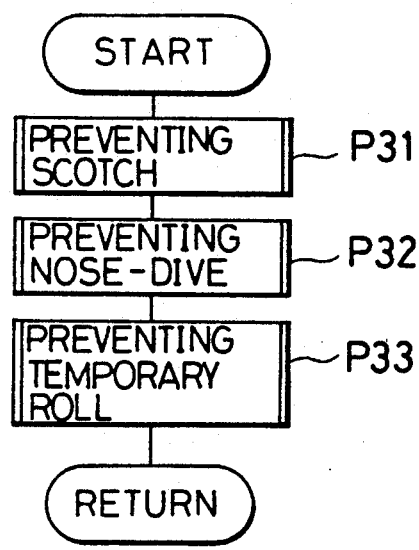
FIG. 18 is a flow chart showing overall control over squat, dive and temporary roll.
Figure 19:
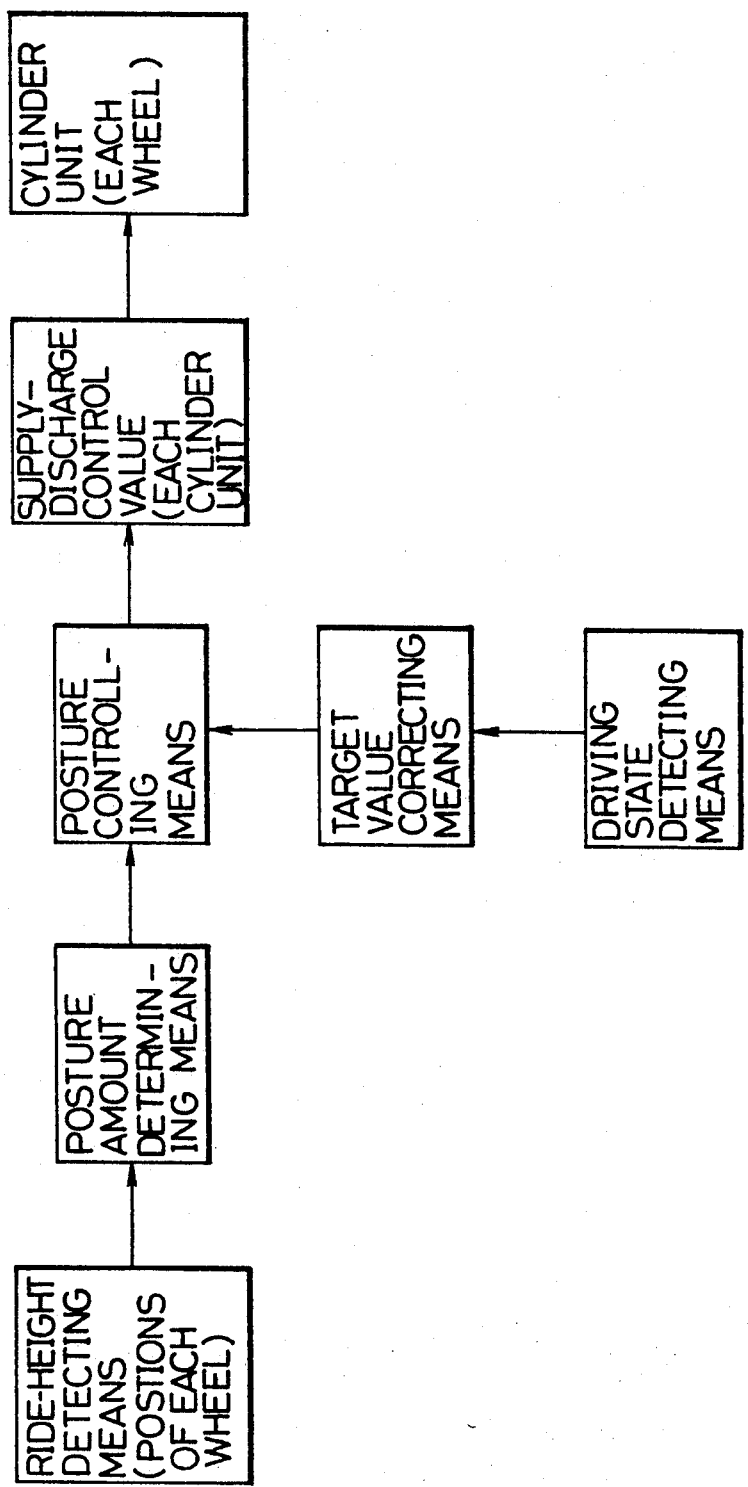
FIG. 19 is a block diagram showing the overall construction of the system according to the present invention.

FIG. 18 illustrates the flow chart of an overall system in performing control for prevention of the squat (FIG. 9 or FIG. 10), for prevention of the nose dive (FIG. 13 or FIG. 14) and for prevention of the temporary roll (FIG. 16 or FIG. 17). In other words, the control for preventing the squat is performed at step P31 as shown in FIG. 9 or FIG. 10, the control for the nose-diving prevention is performed at step P32 as shown in FIG. 13 or FIG. 14, and the control for preventing the temporary roll is implemented at step P33 as shown in FIG. 16 or FIG. 17.

As described hereinabove, it is to be understood that the present invention is not restricted to those embodiments and it should be understood that it encompasses a variety of modifications and variants, for example, as will be described hereinafter, within the scope and spirit of the invention.

The control for preventing the squat resulting from the shifting the range position as described hereinabove can likewise be applied to a vehicle of the type where the front wheels are driven. In this case, the direction in which the target pitch amount is corrected is made opposite to the one of the above embodiments.

Further, it is to be noted herein that the control for the squat prevention according to the present invention can be applied to the instance where the shift is executed to the reverse range position R. In this case, too, the target pitch amount is corrected in the direction opposite to the instance as described hereinabove, when the vehicle is of the rear wheel type.

Although the above embodiment is directed to the instance where the control valve 15 for feeding is separately disposed from the control valve 19 for discharging, it can likewise be applied to the instance where both the control valves 15 and 19 may be comprised of one electromagnetic valve of three ports and three positions.

It is to be understood that the foregoing text and drawings relate to embodiments of the invention given by way of examples but not limitation. Various other embodiments and variants are possible within the spirit and scope of the present invention.

What is claimed is:

1. A suspension apparatus of a vehicle, comprising:
a cylinder unit interposed at each wheel between a sprang weight and an unsprung weight for displacing a ride height by supplying or discharging an operating liquid;
a supply/discharge control valve for independently supplying to or discharging from the cylinder unit;
a plurality of ride height detecting means for independently detecting a ride height of a vehicle body at a position of each wheel;
a status amount determining means for determining an actual status amount of a posture of the vehicle body on the basis of the ride height at the position of each wheel detected by the ride height detecting means;
a posture controlling means for controlling the supply/discharge control valve so as to allow the actual status amount of the posture of the vehicle body determined by the status amount determining means to reach a given target value;
a driving state detecting means for detecting a driving state which changes acceleration of the vehicle body; and
a target value correcting means for correcting the target value so as to cause the posture of the vehicle body to displace in a direction opposite to a direction in which the posture of the vehicle body is caused to displace due to a change of the acceleration of the vehicle body when the driving state which changes acceleration of the vehicle body is detected by the driving state detecting means.

2. A suspension apparatus as claimed in claim 1, wherein:

the status amount, i.e., the target amount, is a pitch amount;

the posture controlling means is to control the supply/discharge control valve so as to allow the pitch amount of the vehicle body to reach a target pitch amount;

the driving state detecting means is to detect a driving state which causes a pitch of the vehicle body; and the target value correcting means is to correct the target pitch amount.

3. A suspension apparatus as claimed in claim 2, wherein:

the target pitch amount prior to correction by the target value correcting means is set to zero; and the target pitch amount after correction by the target value correcting means is set to a value other than zero.

4. A suspension apparatus as claimed in claim 1, wherein:

the status amount, i.e., the target amount, is a roll amount;

the posture controlling means is to control the supply/discharge control valve so as to allow the roll amount of the vehicle body to reach a target roll amount;

the driving state detecting means is to detect a driving state which causes a roll of the vehicle body; and the target value correcting means is to correct the target roll amount.

5. A suspension apparatus as claimed in claim 2, wherein the driving state detecting means is to detect a driving state which cause a squat of the vehicle body.

6. A suspension apparatus as claimed in claim 2, wherein the driving state detecting means is to detect a shift of a range position of an automatic transmission from range position P or N to a running range position.

7. A suspension apparatus as claimed in claim 6, wherein the target value correcting means corrects the target pitch amount for a given period of time from the point of time when the range position is shifted from the range position P or N to the running range position.

8. A suspension apparatus as claimed in claim 7, wherein a correction amount to be corrected by the target value correcting means is a given value which is determined to be always constant.

9. A suspension apparatus as claimed in claim 7, wherein a correction amount to be corrected by the target value correcting means is a value which is gradually decreased from a given initial value.

10. A suspension apparatus as claimed in claim 6, further comprising a second posture control means for controlling the supply/discharge control valve so as to allow a displacing velocity to decrease in a direction away from the target value of a pitch amount to be determined by the status amount determining means.

11. A suspension apparatus as claimed in claim 2, wherein the driving state detecting means is to detect a driving state which causes a nose dive of the vehicle body.

12. A suspension apparatus as claimed in claim 2, wherein the driving state detecting means is to detect operation of a brake for braking the vehicle body.

13. A suspension apparatus as claimed in claim 12, wherein the target value correcting means is to correct the target value during a period of time when the brake is operated.

14. A suspension apparatus as claimed in claim 13, wherein a correction amount to be corrected by the target value correcting means is a given value which is determined to be always constant.

15. A suspension apparatus as claimed in claim 13, wherein a correction amount to be corrected by the target value correcting means is a value which is gradually decreased from a given initial value.

16. A suspension apparatus as claimed in claim 12, further comprising a second posture control means for controlling the supply/discharge control valve so as to allow a displacing velocity to decrease in a direction away from the target value of a pitch amount to be determined by the status amount determining means 17. A suspension apparatus as claimed in claim 4, wherein the driving state detecting means is to detect a state of operating a steering wheel in which transverse acceleration acting upon the vehicle body varies.

18. A suspension apparatus as claimed in claim 17, further comprising a transverse acceleration detecting means for detecting a magnitude of actual transverse acceleration acting upon the vehicle body;

wherein the correction amount to be corrected by the target value correcting means varies in accordance with the magnitude of the actual transverse acceleration detecting by the transverse acceleration detecting means.

19. A suspension apparatus as claimed in claim 18, wherein:

a threshold value for determining the correction amount to be corrected by the target value correcting means is preset so as to comprise a first transverse acceleration value, a second transverse acceleration value which is larger than the first transverse acceleration value, and a third transverse acceleration value which is larger than the second transverse; and the correction amount to be corrected by the target value correctly means is set to be the lowest when the magnitude of the actual transverse acceleration detected by the transverse acceleration detecting means is smaller than the first transverse acceleration value; the correction amount to be corrected by the target value correcting means is set to be largest when the magnitude of the actual transverse acceleration detected by the transverse acceleration detecting means is between the second transverse acceleration value and the third transverse acceleration value; and the correction amount to be corrected by the target value correcting means is set to be middle when the magnitude of the actual transverse acceleration detected by the transverse acceleration detecting means is larger than the third transverse acceleration value.

20. A suspension apparatus as claimed in claim 4, further comprising a transverse acceleration detecting means for detecting a magnitude of actual transverse acceleration acting upon the vehicle body;

wherein the target roll amount varies with the actual transverse acceleration detected by the transverse acceleration detecting means.

21. A suspension apparatus as claimed in claim 17, further comprising a second posture control means for controlling the supply/discharge control valve so as to allow a displacing velocity to decrease in a direction away from the target value of a roll amount to be determined by the status amount determining means.

22. A suspension apparatus as claimed in claim 1, further comprising a second posture control means for controlling the supply/discharge control valve so as to allow a displacing velocity to decrease in a direction away from the target value of a posture status amount to be determined by the status amount determining means.

23. A suspension apparatus as claimed in claim 1, wherein a gas spring is individually connected to each of the cylinder units.

24. A suspension apparatus as claimed in claim 23, wherein each of the cylinder units is connected to the gas spring through an orifice.

25. A suspension apparatus as claimed in claim 24, wherein the orifice is a variable orifice.

26. A suspension apparatus as claimed in claim 1, further comprising:
   vertical acceleration detecting means for detecting a magnitude of vertical acceleration acting upon the vehicle body; and
   a second posture control means for controlling the supply/discharge control valve so as to reduce the magnitude of vertical acceleration detected by the vertical acceleration detecting means.

27. A suspension apparatus as claimed in claim 1, further comprising:
   a pressure detecting means for independently detecting a pressure within each of the cylinder units; and
   a second posture control means for controlling the supply/discharge control valve so as to block a twisting force from acting a portion located between a forward portion and a rearward portion of the vehicle body, in response to output from the pressure detecting means.

28. A suspension apparatus as claimed in claim 1, wherein:
   the supply/discharge control valve is a flow rate control valve; and
   a control signal from the posture control means to the flow rate control valve is set as a flow rate signal.

29. A suspension apparatus as claimed in claim 1, further comprising:
   a second posture control means for controlling the supply/discharge control valve so as to allow a displacing velocity to decrease in a direction away from the target value of a posture status amount to be determined by the status amount determining means;
   vertical acceleration detecting means for detecting a magnitude of vertical acceleration acting upon the vehicle body;
   a third posture control means for controlling the supply/discharge control valve so as to reduce the magnitude of vertical acceleration detected by the vertical acceleration detecting mean
   a pressure detecting means for independently detecting a pressure within each of the cylinder units; and
   a fourth posture control means for controlling the supply/discharge control valve so as to block a twisting force from acting a portion located between a forward portion and a rearward portion of the vehicle body, in response to output from the pressure detecting means.

30. A suspension apparatus as claimed in claim 29, wherein:
   the supply/discharge control valve is a flow rate control valve;
   a control signal from the posture control means is set as a flow rate signal; and
   a sum of the flow rate signal determined by each of the posture control means is determined as a final control signal to the flow rate control valve.

* * * * *